US012136247B2

United States Patent
Karmakar et al.

(10) Patent No.: US 12,136,247 B2
(45) Date of Patent: Nov. 5, 2024

(54) IMAGE PROCESSING BASED METHODS AND APPARATUS FOR PLANOGRAM COMPLIANCE

(71) Applicant: Walmart Apollo, LLC, Bentonville, AR (US)

(72) Inventors: Somedip Karmakar, Karnataka (IN); Souradip Chakraborty, Kolkata (IN); Abhishek Mishra, Bengaluru (IN)

(73) Assignee: Walmart Apollo, LLC, Bentonville, AR (US)

( * ) Notice: Subject to any disclaimer, the term of this patent is extended or adjusted under 35 U.S.C. 154(b) by 405 days.

(21) Appl. No.: 17/825,306

(22) Filed: May 26, 2022

(65) Prior Publication Data

US 2022/0415012 A1 Dec. 29, 2022

Related U.S. Application Data

(60) Provisional application No. 63/214,639, filed on Jun. 24, 2021.

(51) Int. Cl.
*G06V 10/44* (2022.01)
*G06T 7/11* (2017.01)
(Continued)

(52) U.S. Cl.
CPC .............. *G06V 10/443* (2022.01); *G06T 7/11* (2017.01); *G06T 7/73* (2017.01); *G06V 10/54* (2022.01)

(58) Field of Classification Search
CPC ...... G06V 10/443; G06V 10/54; G06V 10/26; G06V 10/46; G06V 10/761; G06V 10/82;
(Continued)

(56) References Cited

U.S. PATENT DOCUMENTS 9,785,898 B2 * 10/2017 Hofman ............... G06Q 10/087
10,726,273 B2 * 7/2020 Phan ...................... G06V 10/50
(Continued)

FOREIGN PATENT DOCUMENTS

CA 2888153 A1 * 4/2014 ......... G06K 7/10861
CA 3162263 A1 * 7/2021 ......... G06K 9/00671
(Continued)

OTHER PUBLICATIONS

Song Liu, et al., "Planogram Compliance Checking Based on Detection of Recurring Patterns," Feb. 22, 2016, pp. 1-7.
(Continued)

*Primary Examiner* — Mahendra R Patel
(74) *Attorney, Agent, or Firm* — Morgan, Lewis & Bockius LLP; Manita Rawat

(57) ABSTRACT

This application relates to automated processes for determining item placement compliance within retail locations. For example, a computing device may obtain an image of a fixture within a store. The image may be captured by a camera with a field of view directed at the fixture. The computing device may apply a segmentation process to the image to determine a portion of the image. Further, the computing device may determine a correlation between the portion of the image and each of a plurality of item image templates. Each item image template may include an image of an item the retail location sells in the retail location. The computing device may determine, based on the correlations, one of the plurality of item image templates and its corresponding item. The computing device may then determine whether the item should be located at the fixture based on a planogram.

17 Claims, 11 Drawing Sheets

(51) Int. Cl.
  *G06T 7/73* (2017.01)
  *G06V 10/54* (2022.01)
(58) Field of Classification Search
  CPC .. G06V 20/52; G06T 7/11; G06T 7/73; G06T 2207/20081; G06T 2207/20084; G06T 7/74
  USPC .......................................................... 382/217
  See application file for complete search history.

(56) References Cited

U.S. PATENT DOCUMENTS

| | | | | |
|---|---|---|---|---|
| 11,042,787 | B1* | 6/2021 | Kumar | G06V 10/751 |
| 11,281,876 | B2* | 3/2022 | Rodriguez | G06Q 10/087 |
| 11,544,666 | B2* | 1/2023 | Hunsicker | G06Q 10/087 |
| 11,720,939 | B2* | 8/2023 | Herz | G06V 10/454 |
| | | | | 235/383 |
| 11,978,011 | B2* | 5/2024 | Fu | G06T 7/55 |
| 2012/0207389 | A1* | 8/2012 | Ghatare | G06T 7/90 |
| | | | | 382/173 |
| 2017/0178060 | A1* | 6/2017 | Schwartz | G06Q 10/087 |
| 2019/0236531 | A1* | 8/2019 | Adato | G06T 7/0002 |
| 2021/0035187 | A1* | 2/2021 | Ning | G06Q 30/0631 |
| 2021/0342785 | A1* | 11/2021 | Mann | G06F 40/186 |

FOREIGN PATENT DOCUMENTS

| | | | | |
|---|---|---|---|---|
| CN | 109564619 A | * | 4/2019 | ....... G05B 19/41895 |
| JP | 6744430 B2 | * | 8/2020 | ............ B25J 11/008 |

OTHER PUBLICATIONS

Bikash Santra, et al., "A comprehensive survey on computer vision based approaches for automatic identification of products in retail store," Mar. 16, 2019, Image and Vision Computing, 86(2019), pp. 45-63.

* cited by examiner

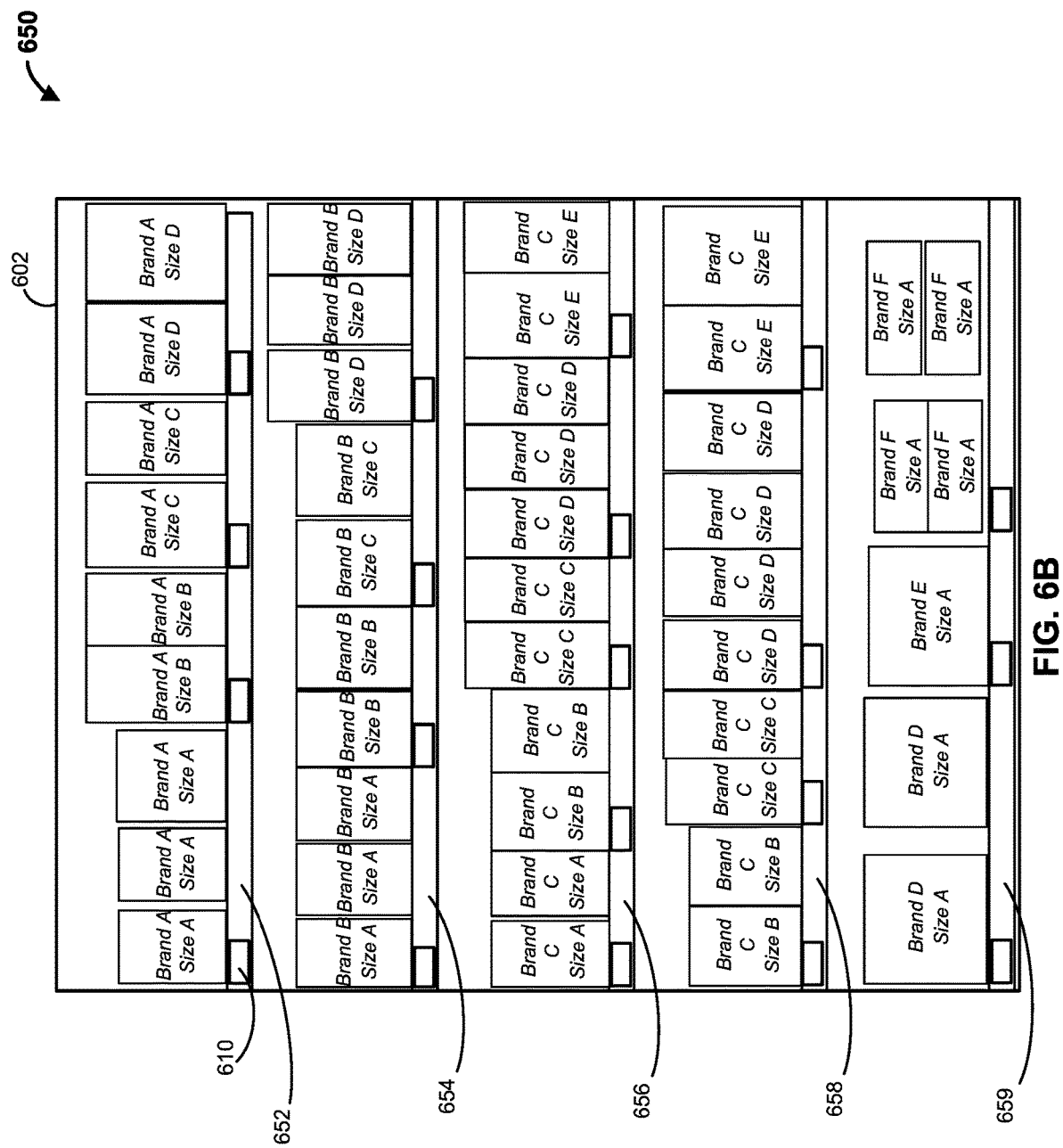

IMAGE PROCESSING BASED METHODS AND APPARATUS FOR PLANOGRAM COMPLIANCE

CROSS-REFERENCE TO RELATED APPLICATIONS

This application claims priority to U.S. Provisional Application Ser. No. 63/214,639, filed on Jun. 24, 2021 and entitled "IMAGE PROCESSING BASED METHODS AND APPARATUS FOR PLANOGRAM COMPLIANCE," and which is hereby incorporated by reference in its entirety.

TECHNICAL FIELD

The disclosure relates generally to image processing and, more specifically, to employing image processing processes to determine item placement compliance within retail locations.

BACKGROUND

Retailers typically must determine where to place items within retail locations, such as within a store. For example, the retailer may place items within a store according to a planogram. The planogram identifies item placement locations, such as shelving, where types of items are to be placed. Store associates may then place the items at the placement locations according to the planogram. In some instances, however, an item may be placed in a wrong location. For example, a store associate may inadvertently place an item of one type on a shelf with items of another type. In other instances, customers may move items from their current locations to another locations. For these and other reasons, items may be located in locations that are not in accordance with the planogram. Misplaced items can cost the retailer time and money, for example, by having associates find and replace misplaced items, and by causing inaccurate inventory counts. Misplaced items may also frustrate customers, as they may not find an item they are looking for because the item is misplaced, or by finding other items in a place they expect to find a particular item. As such, there are opportunities to address item placement compliance.

SUMMARY

The embodiments described herein are directed to the automated processes for determining item placement compliance with corresponding item placement assignments, such as those specified within a planogram. The embodiments may employ image processing techniques, as well as trained machine learning processes, to determine whether items are placed in accordance with assigned placement locations. For instance, the embodiments may capture an image of an item placement location, such as a shelf, located within a retail location. The image may be captured using a camera directed at the item placement location, such as a ceiling mounted camera or a drone camera. The embodiments may process the image to determine a portion of the image, and may further determine, from a plurality of stored template images, a template image that most closely matches the portion of the captured image. By focusing on a portion of the captured image, the embodiments significantly reduce a search space (e.g., the entire image), thereby reducing required processing power and time. The embodiments may then determine whether an item corresponding to the determined template image should be located at the item placement location from where the image was captured. For example, the embodiments may determine, from a planogram, whether the item should be located at the item placement location. The embodiments may generate data characterizing the item determined to be located at the item placement location, and may store the data in a data repository. In some examples, if the embodiments determine, based on the planogram data, that the item is misplaced, the embodiments may generate and transmit an alert message indicating that the item is misplaced.

Among other advantages, the embodiments may provide automatic processes to detect misplaced items within a retail location, and to verify the correct placement of items. The embodiments may also determine current inventory levels of items within the retail locations. For example, the embodiments may determine whether an item is placed at an incorrect location, and whether a correct number of items are placed in an assigned placement location. Further, the embodiments may verify whether item tags, such as those that show an item number and corresponding price, are correctly placed (e.g., with the corresponding item). As such, the embodiments may reduce labor costs associated with finding misplaced items as well as with verifying inventory levels, and may prevent price uncertainties due to misplaced tags, for example. Persons of ordinary skill in the art would recognize additional advantages as well.

In accordance with various embodiments, exemplary systems may be implemented in any suitable hardware or hardware and software combination, such as in one or more suitable computing devices. For example, in some examples, a computing device obtains an image of a fixture within a store. The image may be captured by a camera with a field of view directed at the fixture. The computing device applies a segmentation process to the image to determine a portion of the image. Further, the computing device determines a correlation between the portion of the image and each of a plurality of item image templates. Each item image template may include an image of an item the retail location sells in the retail location. The computing device also determines one of the plurality of item image templates based on the correlations, and may determine a corresponding item. The computing device may then determine whether the item should be located at the fixture based on a planogram.

In some embodiments, a computing device (e.g., server) comprising at least one processor is configured to obtain an image, and apply a segmentation process to the image to determine a portion of the image. Further, the computing device is configured to determine a correlation between the portion of the image and each of a plurality of item image templates. The computing device is also configured to determine one of the plurality of item image templates based on the correlations. The computing device is further configured to generate identification data associating the image to an item corresponding to the determined one of the plurality of item image templates. The computing device is also configured to store the identification data in a data repository.

In some embodiments, a method by at least one processor includes obtaining an image, and applying a segmentation process to the image to determine a portion of the image. Further, the method includes determining a correlation between the portion of the image and each of a plurality of item image templates. The method also includes determining one of the plurality of item image templates based on the correlations. Further, the method includes generating identification data associating the image to an item corresponding to the determined one of the plurality of item image templates. The method also includes storing the identification data in a data repository.

In some embodiments, a non-transitory computer readable medium has instructions stored thereon. The instructions, when executed by at least one processor, cause a device to perform operations that include obtaining an image, and applying a segmentation process to the image to determine a portion of the image. Further, the operations include determining a correlation between the portion of the image and each of a plurality of item image templates. The operations also include determining one of the plurality of item image templates based on the correlations. Further, the operations include generating identification data associating the image to an item corresponding to the determined one of the plurality of item image templates. The operations also include storing the identification data in a data repository.

In some embodiments, a computing device comprising at least one processor is configured to obtain an image, and apply a segmentation process to the image to determine a portion of the image. Further, the computing device is configured to obtain image embeddings for each of a plurality of item image templates. The computing device is also configured, for each of the plurality of item image templates, to determine a convolution of the image embeddings across the portion of the image. For instance, determining the convolution may include applying a filter of a query image to produce a feature map, where the feature map indicates locations and strengths of each detected feature. The computing device is further configured to determine one of the plurality of item image templates based on the convolutions and the corresponding image embeddings. The computing device is further configured to generate identification data associating the image to an item corresponding to the determined one of the plurality of item image templates. The computing device is also configured to store the identification data in a data repository.

In some embodiments, a method by at least one processor includes obtaining an image, and applying a segmentation process to the image to determine a portion of the image. Further, the method includes obtaining image embeddings for each of a plurality of item image templates. The method also includes, for each of the plurality of item image templates, determining a convolution of the image embeddings across the portion of the image. The method further includes determining one of the plurality of item image templates based on the convolutions and the corresponding image embeddings. The method also includes generating identification data associating the image to an item corresponding to the determined one of the plurality of item image templates. The method further includes storing the identification data in a data repository.

In some embodiments, a non-transitory computer readable medium has instructions stored thereon. The instructions, when executed by at least one processor, cause a device to perform operations that include obtaining an image, and applying a segmentation process to the image to determine a portion of the image. Further, the operations include obtaining image embeddings for each of a plurality of item image templates. The operations also include, for each of the plurality of item image templates, determining a convolution of the image embeddings across the portion of the image. The operations further include determining one of the plurality of item image templates based on the convolutions and the corresponding image embeddings. The operations also include generating identification data associating the image to an item corresponding to the determined one of the plurality of item image templates. The operations further include storing the identification data in a data repository.

In some embodiments, a computing device comprising at least one processor is configured to obtain an image, and apply a segmentation process to the image to determine a portion of the image. Further, the computing device is configured to generate a plurality of keypoints based on the portion of the image. The computing device is also configured to determine a plurality of keypoint scores based on a matching of the plurality of keypoints to keypoints for each of a plurality of item image templates. The computing device is further configured to determine one of the plurality of item image templates based on the keypoint scores. The computing device is also configured to generate identification data associating the image to an item corresponding to the determined one of the plurality of item image templates. The computing device is further configured to store the identification data in a data repository.

In some embodiments, a method by at least one processor includes obtaining an image, and applying a segmentation process to the image to determine a portion of the image. Further, the method includes generating a plurality of keypoints based on the portion of the image. The method also includes determining a plurality of keypoint scores based on a matching of the plurality of keypoints to keypoints for each of a plurality of item image templates. The method further includes determining one of the plurality of item image templates based on the keypoint scores. The method also includes generating identification data associating the image to an item corresponding to the determined one of the plurality of item image templates. The method further includes storing the identification data in a data repository.

In some embodiments, a non-transitory computer readable medium has instructions stored thereon. The instructions, when executed by at least one processor, cause a device to perform operations that include obtaining an image, and applying a segmentation process to the image to determine a portion of the image. Further, the operations include generating a plurality of keypoints based on the portion of the image. The operations also include determining a plurality of keypoint scores based on a matching of the plurality of keypoints to keypoints for each of a plurality of item image templates. The operations further include determining one of the plurality of item image templates based on the keypoint scores. The operations also include generating identification data associating the image to an item corresponding to the determined one of the plurality of item image templates. The operations further include storing the identification data in a data repository.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein:

FIGS. 6A and 6B illustrate item placement locations in accordance with some embodiments;

DETAILED DESCRIPTION

Figure 1:
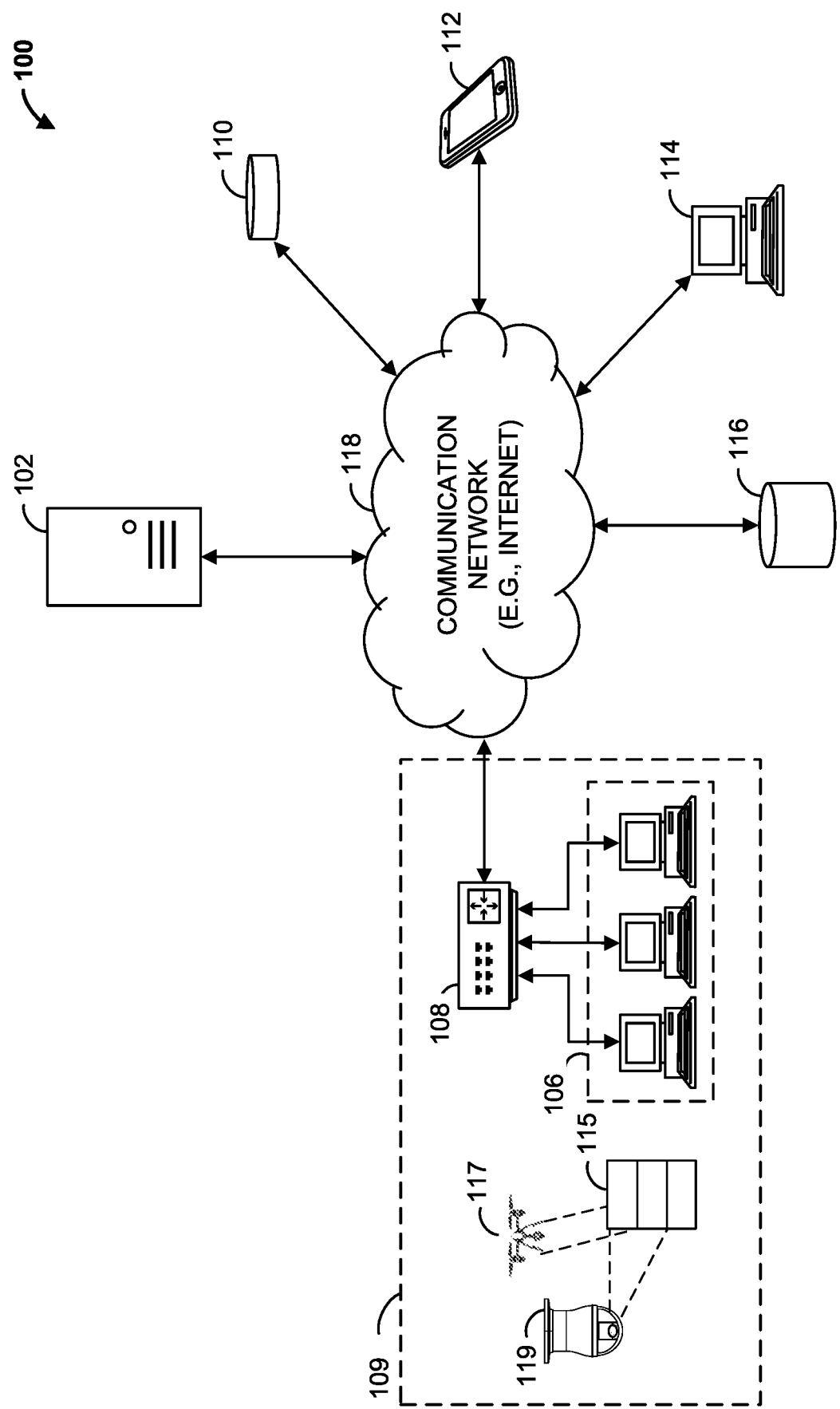
FIG. 1 is a block diagram of an item identification system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship."

The embodiments may employ a real-time artificial intelligence system that captures images of item placement locations (e.g., shelfs) using, for example, ceiling mounted cameras, cameras from drones, cameras from shelf-scanning robots, or any other suitable cameras, and processes the images to determine a relevant portion of the images. The embodiments may apply segmentation processes, such as segmentation processes based on color, to determine the relevant portion of the images. In some examples, the embodiments may, additionally or alternatively, determine boundaries, such as price tag boundaries, within the image, and may detect corners within the image (e.g., using Harris Corner detection). Further, the embodiments may determine an item image template, from a plurality of item image templates, that best matches the relevant portion of the image. For example, and as described herein, the embodiments may determine the item image template based on determining correlations between the relevant portion of the image and each of the plurality of item image templates.

Additionally or alternatively, in some examples, the embodiments may obtain image embeddings for each of the plurality of item image templates, and may determine a convolution of the image embeddings across the portion of the image. The embodiments may then determine the item image template based on the convolutions and the corresponding image embeddings. For instance, the embodiments may determine a cosine similarity between the image embeddings and the convolved portion of the image. Additionally or alternatively, in some examples, the embodiments generate a plurality of keypoints based on the relevant portion of the image, and may determine a plurality of keypoint scores based on a matching of the plurality of keypoints to keypoints for each of the plurality of item image templates. The embodiments may determine one of the plurality of item image templates based on the keypoint scores.

In some examples, the embodiments extract text from the captured image and matches the extracted text to text corresponding to each of the item image templates. For example, the embodiments may compare the extracted text to a product name and description corresponding to each item image template. The embodiments may determine one of the plurality of item image templates based, at least partially, on the comparison. The embodiments may then determine that the item corresponding to the determined item image template is located at the location from which the image was captured. The embodiments may further determine, based on a planogram, whether the detected item is placed in its correct (e.g., assigned) location. The embodiments may be employed to determine, for example, item assortment compliance, number of facings compliance, position compliance, item tag mismatch, and shelf availability, for example.

Turning to the drawings, FIG. 1 illustrates a block diagram of an item identification system 100 that includes item identification computing device 102 (e.g., a server, such as an application server), workstation(s) 106, database 116, and multiple associate computing devices 110, 112, 114 operatively coupled over network 118. Item identification computing device 102, workstation(s) 106, and multiple associate computing devices 110, 112, 114 can each be any suitable computing device that includes any hardware or hardware and software combination for processing data. For example, each of item identification computing device 102, workstations 106, and multiple associate computing devices 110, 112, 114 can include one or more processors (e.g., each processor including one or more processing cores), one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, each of item identification computing device 102 and workstations 106 can be a computer, a workstation, a laptop, a server such as a cloud-based server, a distributed computing system, or one or more of any other suitable device. Each of multiple associate computing devices 110, 112, 114 can be a mobile device such as a cellular phone, a laptop, a computer, a table, a personal assistant device, a voice assistant device, a digital assistant, or any other suitable device.

Workstation(s) 106 are operably coupled to communication network 118 via router (or switch) 108. Workstation(s) 106 and/or router 108 may be located at a store 109, for example. Workstation(s) 106 can communicate with item identification computing device 102 over communication network 118. The workstation(s) 106 may send data to, and receive data from, item identification computing device 102. For example, the workstation(s) 106 may transmit data related to a layout of a store, such as store 109, to item identification computing device 102.

Store 109 may further include one or more cameras, such a ceiling mounted camera 119, and a drone camera 117 mounted to a drone. The cameras 117, 119 may be directed to capture images from one or more item placement locations 115, such as shelves, endcaps, rotating fixtures, or any other suitable item placement locations. In some examples, one of workstations 106 and associate computing devices 110, 112, 114 executes an application (e.g., "App") that allows for communication with the drone that operates drone camera 117. The application may allow an associate to position the drone to capture one or more images of item placement locations within store 109. In some examples, the drones are programmed to automatically capture images of predetermined item placement locations. The captured images may be transmitted to (e.g., downloaded by) the workstation 106 or associate computing device 110, 112, 114. Further, the workstation 106 or associate computing device 110, 112, 114 may transmit the captured images to item identification computing device 102.

Database 116 can be a remote storage device, such as a cloud-based server, a memory device on another application server, a networked computer, or any other suitable remote storage. Item identification computing device 102 is operable to communicate with database 116 over communication network 118. For example, item identification computing device 102 can store data to, and read data from, database 116. For instance, item identification computing device 102 may store planogram data within database 116. Planogram data may characterize an assignment of items to fixtures within a store, such as store 109. Although shown remote to item identification computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Item Placement Compliance

Figure 5:
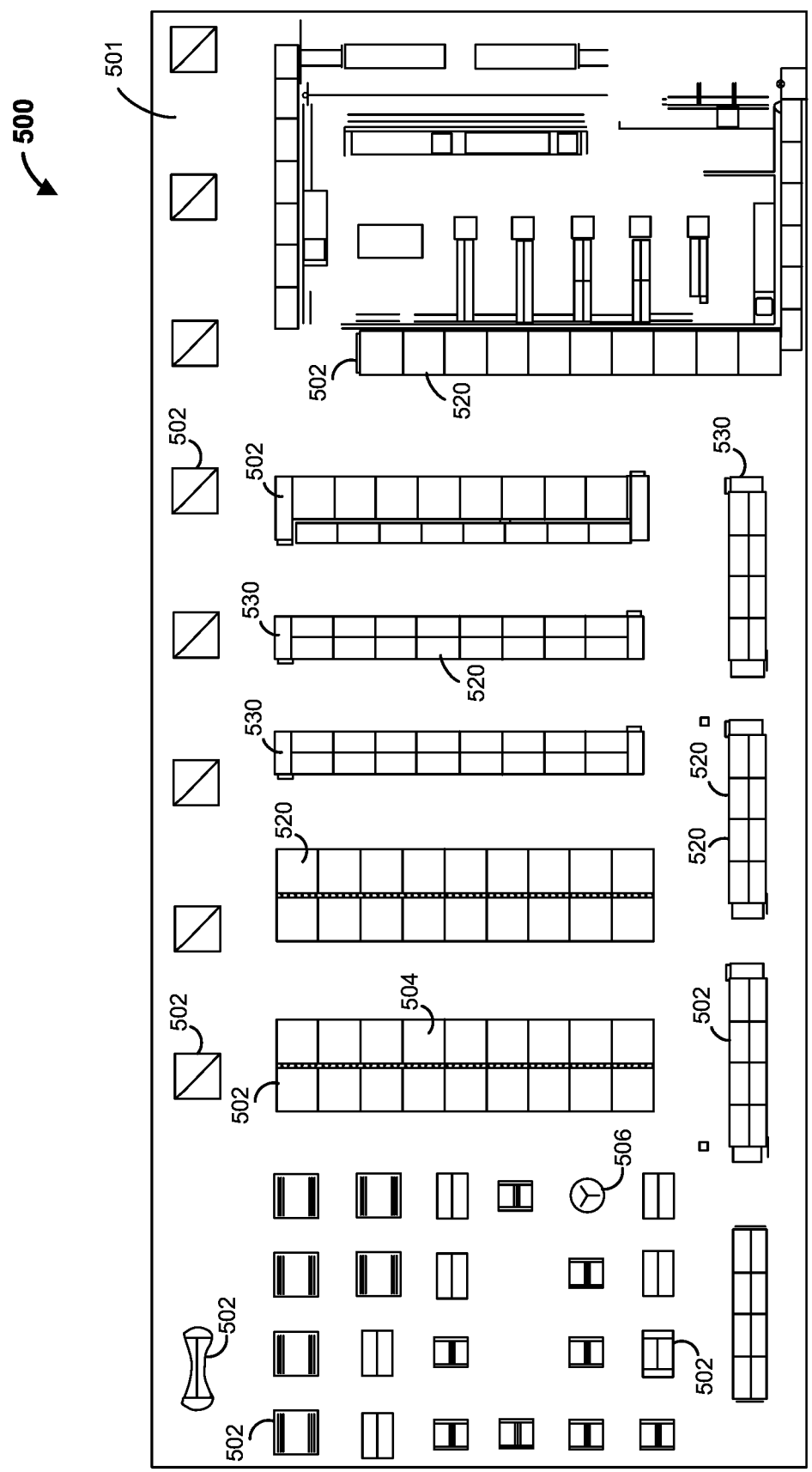
FIG. 5 illustrates a retail location layout in accordance with some embodiments.

A planogram may define item assignments to each of a plurality of item placement locations within a retail location, such as store 109. For instance, FIG. 5 illustrates a planogram 500 of a retail location 501 that includes various fixtures 502. Each fixture 502 may be one of a plurality of fixture types, such as shelving 504 and rotating fixture 506. At least some fixture types may include one or more sections 520, and at least some fixture types may include one or more end caps 530. Planogram 500 may further define what items are to be placed at each fixture 502. For instance, the planogram 500 may define, for each fixture 502, one or more locations within the fixture 502 (e.g., using X, Y coordinates relative to retail location 501, a textual description, such as "top shelf," "bottom shelf," an assignment system where each section of each fixture 502 is assigned an identifier, or any suitable fixture location identification mechanism), an item (e.g., using an item identifier (ID), such as a Universal Product Code number) assigned to each of the locations within the fixture 502, and, in some examples, a number of the item expected at each of the locations (e.g., 5, 10, 100, etc.). Database 116 may store planogram data characterizing a planogram, such as planogram 500, for example.

As described herein, item identification computing device 102 may determine whether items physically located within the retail location match to the assignments defined by the planogram. For example, item identification computing device 102 may obtain images captured from one or more cameras 117, 119. The captured images may show one or more items located within an item placement location, such as items located at a fixture 502. Item identification computing device 102 may determine whether the items shown in the captured images correspond to items that are assigned by the planogram to be placed at the item placement location.

Image Search Space Reduction

Item identification computing device 102 may apply a segmentation process to the captured images to determine relevant portions of the images. For instance, item identification computing device 102 may apply a color based segmentation process, such as a segmentation model based on k-means clustering in color (e.g., red, green, blue) space. The segmentation model can balance color proximity (e.g., how close similar colors are to each other within the image) and space proximity (e.g., how close two items are to each other). For instance, pixels of various red shades are in closer color proximity to each other than a pixel of a red shade and a pixel of a blue shade are to each other. Similarly space proximity of pixels may be measured in terms of how close they are in shape and in separation of empty and blank positions in the image. For example, the segmentation model may weight space proximity with a first value and color proximity with a second value. In some instances, space proximity is weighted more than color proximity (e.g., the first value is higher than the second value), which may result in defining more square-like or cubic-like shapes within the image.

Figure 6A:
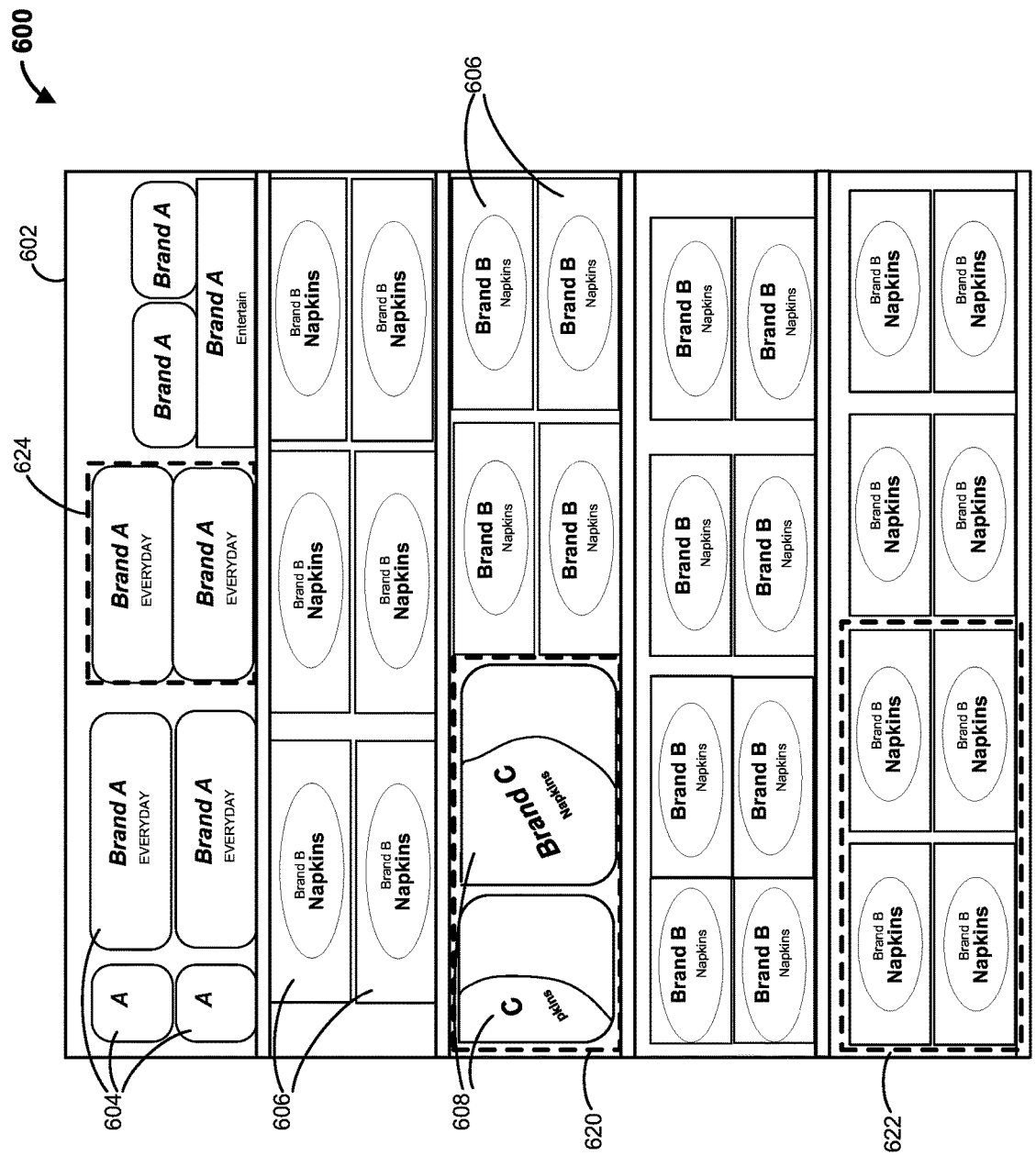

For instance, FIG. 6A illustrates an image 600 of an item placement location 502 that includes a plurality of varying items, such as brand A items 604, brand B items 606, and brand C items 608. Each of brand A items 604, brand B items 606, and brand C items 608 may include packaging with identifying features, such as a name, brand, and description of the item. In addition, the color of the packaging may differ between the items. For example, brand A items 604 may be in packaging that includes a first color (e.g., primarily white), while brand B items 606 and brand C items 608 may be in packaging that includes a second color (e.g., primarily red) and a third color (e.g., primarily green), respectively.

Item identification computing device 102 may apply the segmentation model to the image 600, and may generate segmentation outputs 620, 622, 624, each of which defines portions of the image 600. In this example, segmentation output 620 includes portions of brand C items 508, while segmentation output 522 includes portions of brand B items 506 and segmentation output 524 includes portions of brand A items 504.

Additionally or alternatively, item identification computing device 102 may apply a price tag determination process to identify price tag boundaries within the captured image. For instance, price tags may be placed on a predetermined location, such as the left bottom corner of a shelf, when a new product begins. As such, the price tags may distinguish between products of a same brand that vary, such as by having varying pack sizes, colors, or features. As such, while the color-based segments may define areas of an image that includes items of a same brand that vary, determining price tag placement may assist in uniquely identify a new item's starting point on the shelf.

As an example, FIG. 6B illustrates an image 650 of an item placement location 502 that includes varying items of a same brand, and items of varying brands. For instance, image 650 includes brand A items of varying sizes on a first (e.g., top) shelf 652, as well as brand B items of varying sizes on a second shelf 654, brand C items of varying sizes on a third shelf 656, additional brand C items of varying sizes on a fourth shelf 658, and brand D items of varying sizes on a fifth (e.g., bottom) shelf 659. Image 650 also illustrates price tags 660, which generally begin at the left bottom corner of each shelf where a new product (e.g., a product not exactly similar to one preceding it) begins. Item identification computing device 102 may apply the price tag determination process to the image 650 to identify the boundaries of price tags 660.

To identify the boundaries of price tags 660, item identification computing device 102 may apply a price tag determination process that includes the execution of a template matching model (e.g., algorithm), with the template being an image of any generic price tag. The output data of the template matching model characterizes the boundaries of the price tags. The output data of the executed template matching model may, for instance, include values identifying whether portions of an input image include any price tags as defined by an input template.

Additionally or alternatively, item identification computing device 102 may apply a corner detection process to determine corners with the captured image. For instance, item identification computing device 102 may apply a corner detection process, such as a Harris Corner detection model, to detect corners within the captured image. A corner may be detected at the junction of two edges, where there is a change in image brightness (e.g., by a predetermined amount). In some examples, to detect the corners, item identification computing device 102 may employ a sliding window across the image. For instance, item identification computing device 102 may select a pixel in the image, center the window over the selected pixel, and compute a window value (e.g., a sum squared) based on pixel values within the window. Item identification computing device 102 may then shift the window by a predetermined amount (e.g., 1 pixel, 10 pixels, etc.) in each of a plurality of directions (e.g., up, down, left, right, up-right, down-right, up-left, and down-left), and compute the window value for each direction. Further, item identification computing device 102 may compute a difference (e.g., sum squared difference (SSD)) between the original window value and the window value in each direction. Item identification computing device 102 may detect a corner whenever the difference is greater than a threshold in at least one direction. In some examples, the computed differences must be greater than the predetermined threshold in each direction (e.g., in 8 directions). In some examples, a coroner is detected when the computed differences are less than the predetermined threshold in each direction. If detected, the original window is deemed to include the corner, at least in some examples.

Thus, item identification computing device 102 may to determine relevant portions of the images based on one or more of the segmentation processes, price tag determination processes, or corner detection processes. In some examples, item identification computing device 102 generates reduced image data characterizing relevant portions of the image as identified by any of the segmentation processes, price tag determination processes, or corner detection processes. In some examples, item identification computing device 102 determines overlapping portions of the image as identified by each of the segmentation processes, price tag determination processes, and corner detection processes, and generates reduced image data characterizing the overlapping portions (e.g., portions of the image that were identified by each of the segmentation processes, price tag determination processes, and corner detection processes).

Image Search and Matching

Item identification computing device 102 may determine an item image template corresponding to the image portion identified by the reduced image data. For example, database 116 may store a plurality of item image templates, where each item image template corresponds to an item and includes an image of the item, such as an image of the item as packaged and sold in a retail location, an image of an advertisement of the item, or any other suitable corresponding image. Item identification computing device 102 may determine one of the plurality of item image templates that most closely associates with the image portion identified by the reduced image data.

Figure 6C:
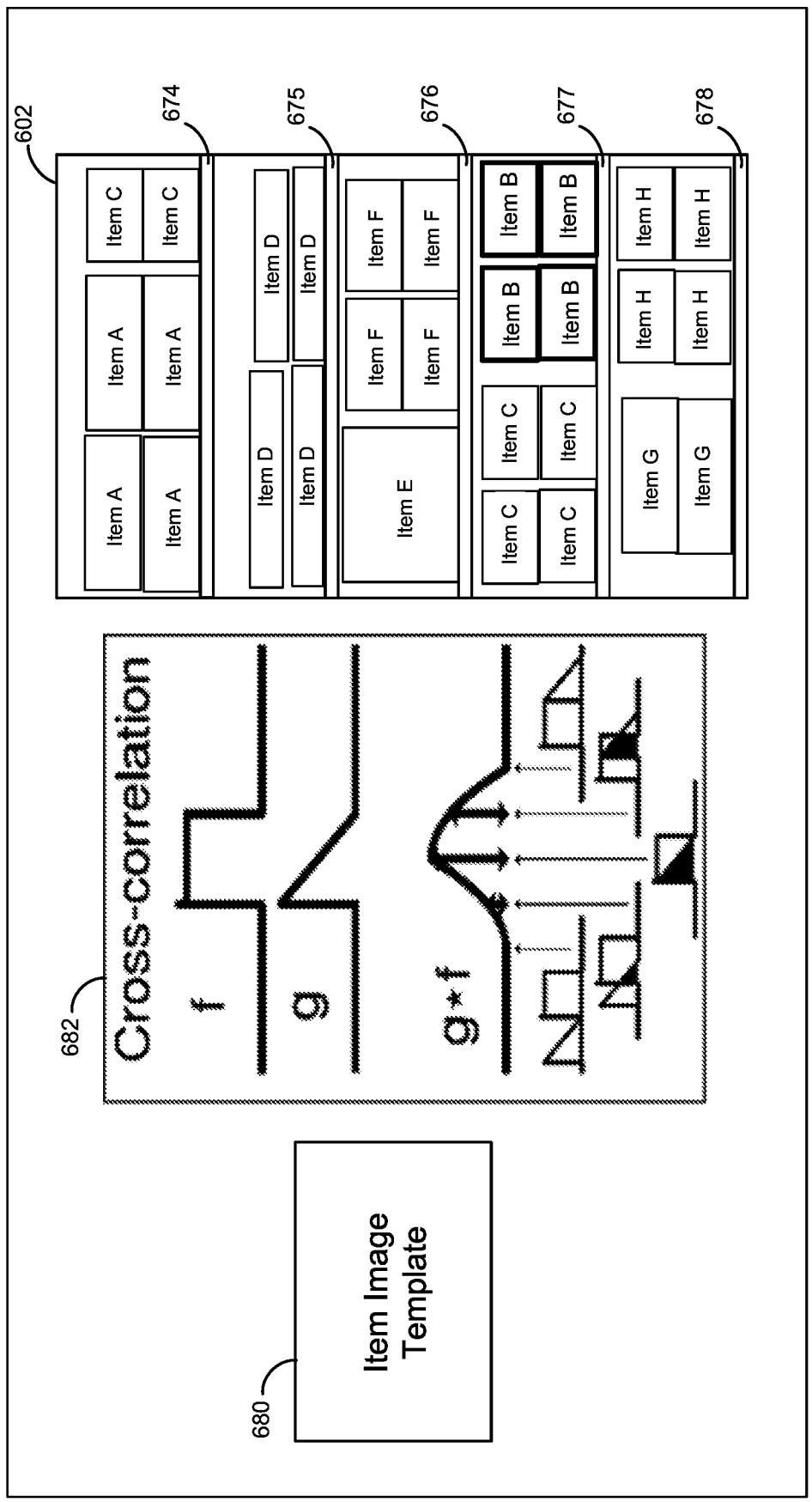
FIG. 6C illustrates a correlation between an item image template and an image of an item placement location in accordance with some embodiments.

In some examples, item identification computing device 102 matches the reduced image data to one of the plurality of item image templates based on determining a correlation between the reduced image data and each of the plurality of item image templates. For instance, FIG. 6C illustrates an image of a fixture 502 with various items on each of five shelves. A first shelf 674 includes a plurality of item A and a plurality of item C. A second shelf 675 includes a plurality of item D. A third shelf 676 includes an item E and a plurality of item F. A fourth shelf 677 includes a plurality of item C and a plurality of item B. A fourth shelf 678 includes a plurality of item G and a plurality of item H. Further, FIG. 6C illustrates a correlation 682 at various points between an item image template 680 and the image of the fixture 502. FIG. 6C further illustrates item identification computing device 102 computing a correlation 682 between an item image template 680 (also represented by "f" in correlation 682) and various locations (e.g., a window centered at particular X, Y pixel coordinates) of an image of the fixture 502 (also represented by "g" in correlation 682).

For instance, item identification computing device 102 may determine a correlation 682 of the item image template 680 to the image of the fixture 502 at various scales of the item image template 680. Each scale of the item image template 680 may correspond to a sizing (e.g., re-sizing) of the image template 680. For example, item identification computing device 102 may divide the image portion identified by the reduced image data into multiple portions, each portion corresponding to a size of item image template 680 (e.g., 64 pixels by 64 pixels, 128 pixel by 128 pixels, etc.). Item identification computing device 102 may then scale the item image template 680 to a first scale (e.g., 25%), and determine a first correlation (e.g., cross-correlation) value (e.g., correlation coefficient) to a first portion of the reduced image data. Item identification computing device 102 may then scale the item image template 680 to a second scale (e.g., 125%), and determine a second correlation value to the first portion of the reduced image data. As such, item identification computing device 102 may determine correlation values at multiple scales at each of the plurality of portions of the reduced image data, and determine the highest correlation value from among those computed. In some examples, the item image templates 680 include a plurality of a same image for a same item, although at different orientations (e.g., 90°, rotated 180° (e.g., upside down), and rotated 270°).

In this example, item image template 680, when correlated to an item B on fourth shelf 677, may have the highest correlation value. As a result, item identification computing device 102 may determine that item B is the item corresponding to the item image template 680. In other words, if the item image template 680 corresponds to "Brand ABC napkins," item identification computing device 102 determines that item B is a "Brand ABC napkins" product. In some examples, the highest correlation value must also be over a predetermined threshold for item identification computing device 102 to determine that an item corresponds to the item image template 680. In some examples, item identification computing device 102 determines the highest correlation value at each of the portions of the reduced image data, and determines an item for each portion based on the item image template 680 associated with the highest correlation value for each portion.

Additionally or alternatively, in some examples, item identification computing device 102 obtains image embeddings for each of the plurality of item image templates and, for each of the plurality of item image templates, applies a convolution process to the image embeddings across the image portion identified by the reduced image data. Item identification computing device 102 may generate the image embeddings based on applying a trained deep learning model, such as a trained deep learning convolutional neural network (CNN), to each of the plurality of item image templates. The deep learning CNN may have been pre-trained based on features generated from a dataset of images, for example.

Figure 7:
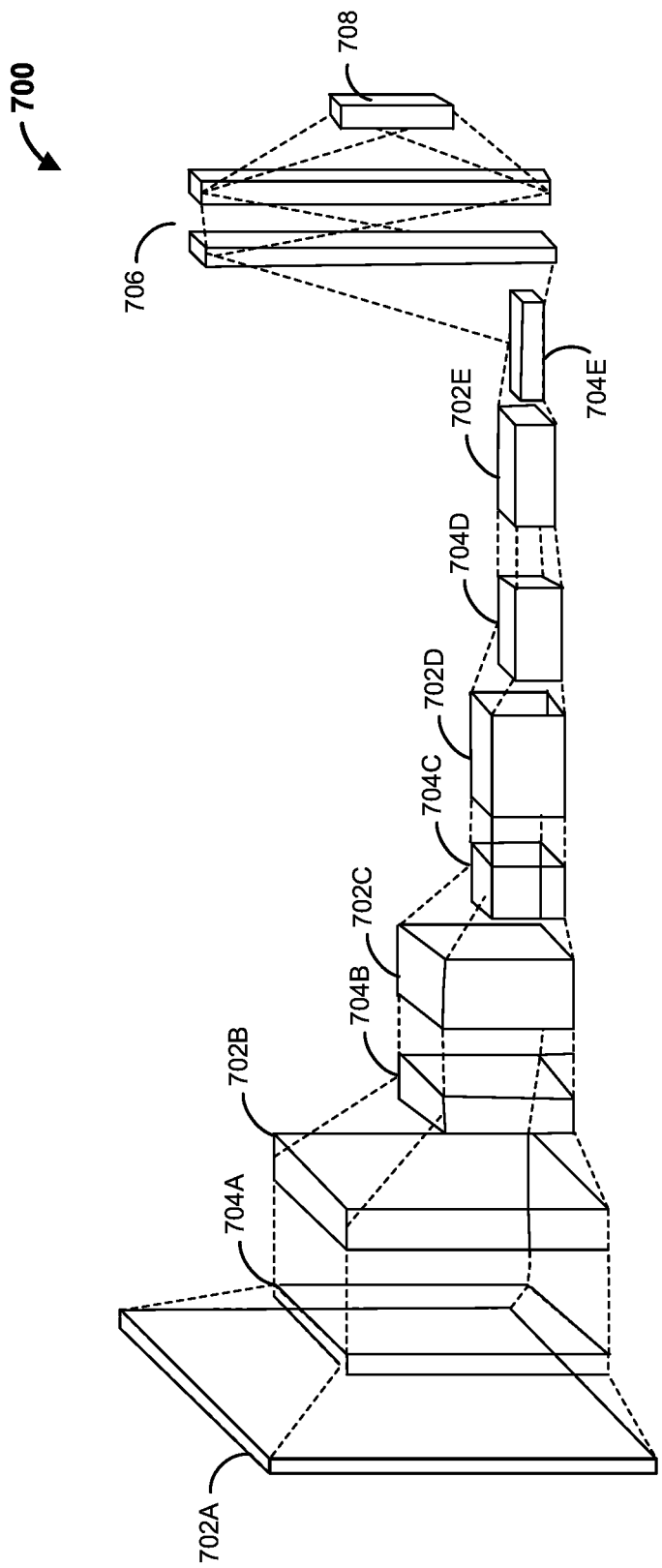
FIG. 7 illustrates a deep learning model in accordance with some embodiments.

For instance, FIG. 7 illustrates an exemplary CNN model 700 that includes convolutional layers 602A, 602B, 602C, 602D, 602E (e.g., convolution and ReLU), and corresponding maxpool layers 604A, 604B, 604C, 604D, 604E. CNN model 700 also includes fully connected layers 606, and a final output layer 608, which may be a Softmax layer, for example. The final output layer 608 provides an output value, such as an image embedding. For instance, an image may be provided to CNN model 700, and one or more image embeddings may be generated as an output of the final output layer 608. For instance, for each input image, an embedding layer is generated by the final output layer 608.

Further, item identification computing device 102 then convolves the image embeddings corresponding to each of the plurality of item image templates across the image portion identified by the reduced image data to generate a convolved image. In other words, a comparison of each image template with each section of the reduced shelf image is performed. For instance, a CNN model may be applied to each of an item image template and a reduced shelf image, and the embedding layers of each CNN are compared to find a similarity. Item identification computing device 102 may then compute similarity scores between the image embeddings and the convolved image. For instance, item identification computing device 102 may compute a cosine similarity score between the image embeddings and the convolved image. A higher cosine similarity score indicates a greater probability that the image embeddings include the one or more items within the convolved image. Item identification computing device 102 may then determine one of the plurality of item image templates based on the similarity scores. For instance, item identification computing device 102 may determine the item image template corresponding to the highest similarity score.

In some examples, the highest similarity score must also be over a predetermined threshold for item identification computing device 102 to determine that an item corresponds to an item image template. In some examples, item identification computing device 102 determines the highest similarity score at each of a plurality of portions of the reduced image data, and determines an item for each portion based on the item image template 680 associated with the highest similarity score for each portion.

Additionally or alternatively, item identification computing device 102 may generate a plurality of keypoints based on the portion of the image identified by the reduced image data. For instance, item identification computing device 102 may apply a keypoint detection process to the reduced image data to determine the keypoints. Each keypoint may identify, for example, portions of the image where there is a corner, a color change, or a brightness change, for example. Item identification computing device 102 may also identify keypoints in each of the plurality of item image templates. Further, item identification computing device 102 may match the keypoints of the reduced image data to the keypoints of each of the plurality of item image templates. Based on the matching, item identification computing device 102 may determine the image template with the closest match. The keypoint detection process described herein may be useful in situations where, for example, only a portion of a product is captured in the image.

In some examples, applying the keypoint detection process includes applying a Scale Invariant Feature Transform model to extract the keypoints from an image and determine the keypoint descriptors.

Scale-space peak Selection: The Scale Invariant Feature Transform model may determine a difference of Gaussian blurring of the image with each of one or more variances. For instance, a scale space of an image may be defined as a function that is generated from the execution of a convolution of a Gaussian kernel (Blurring) at different scales with an input image. The scale-space may be separated into octaves, and the number of octaves and scales may depend on the size of the original image. In some examples, each octave's image size is half a previous one. Within an octave, images are progressively blurred using the Gaussian Blur operator (e.g., the convolution of the Gaussian operator and the image). Gaussian blur has a particular expression or "operator" that is applied to each pixel, thereby resulting in the blurred image.

These blurred images may be employed to generate another set of images, the Difference of Gaussians (DoG). These DoG images are used to find interesting keypoints in the image. The difference of Gaussian is obtained as the difference of Gaussian blurring of an image with two different variances. This is performed for different octaves of the image in the Gaussian Pyramid. The scale space and the Difference of Gaussians are then used to calculate Laplacian of Gaussian approximations that are scale invariant. For instance, one pixel in the image is compared with its eight neighbors, as well as nine pixels in the next scale and nine pixels in one or more previous scales. For instance, pixels of the template images are compared to neighbors based on RGB values, to determine the important points. Thus, a total of at least 26 comparisons are made in this example. Further, a determination is made as to whether the results of the comparison are an extrema (e.g., an outlier or extreme point). The determination may be made by comparing the comparison result to a predetermined threshold, for example. Any standard outlier or anomaly detection technique, however, can be applied to determine if the similarity measure is an extrema. If it is a extrema a keypoint is generated.

Keypoint Localization: In some examples, the resulting keypoints are filtered to determine a subset of keypoints. For instance, in some examples, keypoints with intensity values below a threshold are discarded. In some examples, a taylor series expansion of scale space is determined to get a more accurate location of extrema, and if the intensity at this extrema is less than a threshold value (e.g., 0.03), the keypoint is rejected.

Orientation Assignment: In some examples, an orientation is assigned to each of the keypoints (e.g., filtered keypoints). For instance, a neighborhood is determined around the keypoint location depending on the scale, and a gradient magnitude and direction is calculated in that region. An orientation histogram with 36 bins covering 360 degrees is generated. Assume, for example, that the gradient direction at a certain point is 18.759 degrees. The point may be assigned to a 10-19 degree bin. The "amount" that is added to each bin is proportional to the magnitude of the gradient at that point. For instance, the frequency density of the gradient of the key points are added in the corresponding bin. Once all pixels around the keypoint have been assigned to a bin, the histogram will have a peak at some point. The highest peak in the histogram is taken to calculate the orientation. In some examples, any peak above a threshold, such as 80%, of the highest peak may also be considered to calculate the orientation. As an example, keypoints may have the same location and scale, but may have different orientations (e.g., directions).

Keypoint Descriptor: Each keypoint now has a location, a scale, and an orientation. Item identification computing device 102 may now compute a descriptor for the local image region about each keypoint, which may be highly distinctive and invariant as possible to variations such as changes in viewpoint and illumination. To compute the descriptor, item identification computing device 102 may apply a window, such as a 16 by 16 window, around each keypoint. The window is subdivided into blocks, such as into 16 sub-blocks each of a size of 4 pixels by 4 pixels. For each sub-block, a bin orientation histogram, such as an 8 bin orientation histogram, is created. Thus the keypoint descriptor may include, in this example, 128 bin values, each bin value describing a corresponding pixel.

The keypoints between two images may then be matched by identifying nearest neighbors. For instance, item identification computing device 102 may apply a keypoint matching process to compare and match the keypoints. In some examples, the keypoint matching process includes applying a Flann kdtree based matcher to compare and match the keypoints.

In some instances, a second closest-match may be very near to a first closest match. For instance, this may happen due to noise or some other reason. In this case, item identification computing device 102 computes the ratio of the closest-distance to the second-closest distance. If the ratio is greater than a predetermined threshold (e.g., 80%), the keypoints are rejected. This filtering mechanism may reduce close to 90% of false matches while discarding only 5% of otherwise correct matches.

The above keypoint detection and matching processes steps may be followed in sequence to identify one or more item bounding boxes based on the matched keypoints. Further, an overall region of the image is determined based on the bounding boxes (e.g., based on overlapping bounding boxes, item height, and item width). For instance, product dimensions can be obtained by identifying the maximum and minimum overlap of each of the plurality of templates with each shelf image, and the number of matches that are obtained. If there is sufficient distance between two neighboring matches (e.g., the distance is beyond a predetermined threshold), they are treated as separate matches. The overall region may identify where the item is present, how many items are present, and how many facings there are in vertical and horizontal directions.

Text Extraction and Matching

In some examples, item identification computing device 102 applies a textual extraction process to the image portion identified by the reduced image data to detect and extract textual information, and matches the extracted textual information to textual information associated with at least one of the plurality of item image templates. For instance, item identification computing device 102 may apply a deep learning based optical character recognition (OCR) model, such as Tesseract OCR, to the reduced image data to detect textual information. The output of the model includes textual data along with a confidence value. For instance, text data present in shelf labels may be read by applying the deep learning based OCR model to the shelf labels, and may determine a string similarity with an item description (e.g., as present in the planogram). If the string similarity is beyond a predetermined threshold, a determination is made that the model can correctly determine the right product. Further, item identification computing device 102 may apply a deep learning convolution recurrent neural network (CRNN) to the textual data to enhance the textual data. The deep learning CRNN may include a combination of a convolutional neural network and a recurrent neural network. For instance, the convolutional neural network may extract textual data features by applying relevant filters to the input textual data outputted by the deep learning based OCR model, and the recurrent neural network may analyze the generated features to provide output data (e.g., enhanced textual data).

Item identification computing device 102 may then apply a textual matching process to the enhanced textual data and to textual information associated with each of the plurality of item image templates, such as an item name, an item ID, an item brand, an item description, item options, an item price, or any other suitable item information, to determine a best match. The textual matching process may include, in some examples, generating first word embeddings based on the enhanced textual information, and second word embeddings for an item image template, and comparing the first and second word embeddings to generate a text matching score. Item identification computing device 102 may similarly generate a text matching score for each of the plurality of item image templates, and determine one of the plurality of item image templates based on the text matching scores (e.g., the highest text matching score).

Based on one or more of the correlation processes, convolution process, keypoint detection processes, and textual matching processes, item identification computing device 102 associates the captured image to an item corresponding to one of the plurality of item image templates. For instance, item identification computing device 102 may execute any one of the correlation processes, convolution process, keypoint processes, and textual matching processes to associate the captured image to the item. In some instances, item identification computing device 102 executes each of the correlation processes, convolution process, keypoint processes, and textual matching processes, and determines whether at least a minimum number (e.g., two) of the processes determine a same item image template. If at least the minimum number of the processes select a same item image template, item identification computing device 102 associates the captured image to the item corresponding to the same item image template.

Further, item identification computing device 102 generates identification data associating the captured image to an item corresponding to the determined one of the plurality of item image templates. For example, database 116 may store information associating each of the plurality of item image templates to a particular item. The information may include, for example, an item name, an item ID, an item brand, an item description, item options, an item price, or any other suitable item information. Item identification computing device 102 may obtain the information for the item corresponding to the determine item image template, and may generate the identification data identifying the corresponding item based on the obtained information. Further, item identification computing device 102 may store the identification data in database 116.

Figure 2:
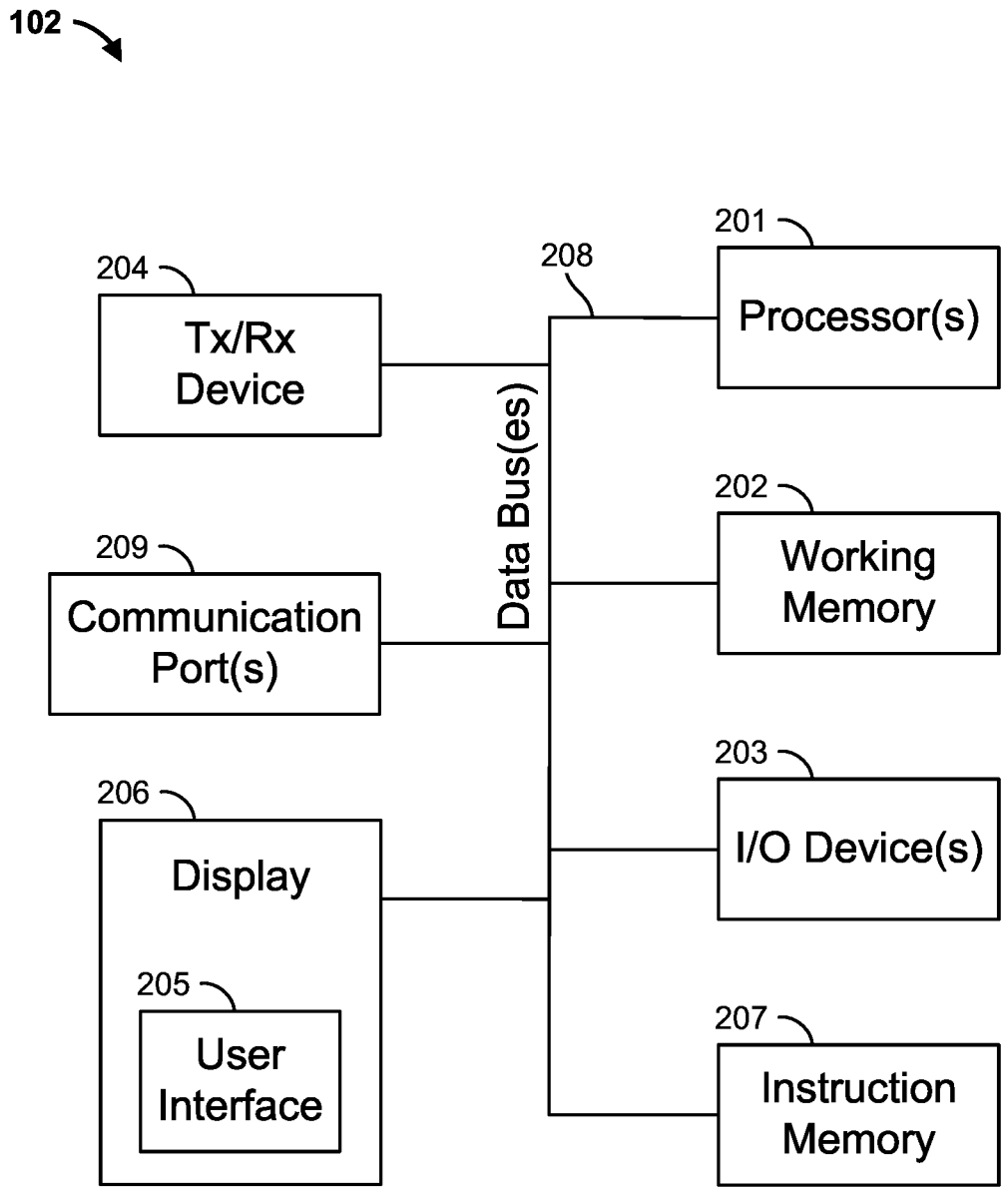
FIG. 2 is a block diagram of an exemplary item identification computing device in accordance with some embodiments.

FIG. 2 illustrates an exemplary item identification computing device 102 of FIG. 1. Item identification computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like. Further, processors 201 can be configured to perform a certain function or operation by executing code embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can store instructions that, when executed by one or more processors 201, cause the one or more processors 201 to perform any of the operations described herein, including generating assignment data as described herein. Instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of item identification computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as layout data.

Display 206 can display user interface 205. User interfaces 205 can enable user interaction with item identification computing device 102. For example, user interface 205 can be a user interface for an application of a retailer that allows for the display of a retail location layout. In some examples, a user can interact with user interface 205 by engaging input-output devices 203. For example, the user may provide input to item identification computing device 102 via user interface 205. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 Item identification computing device 102 will be operating in. Processor(s) 201 is operable to receive data from, or send data to, a network, such as communication network 118 of FIG. 1, via transceiver 204.

Figure 3:
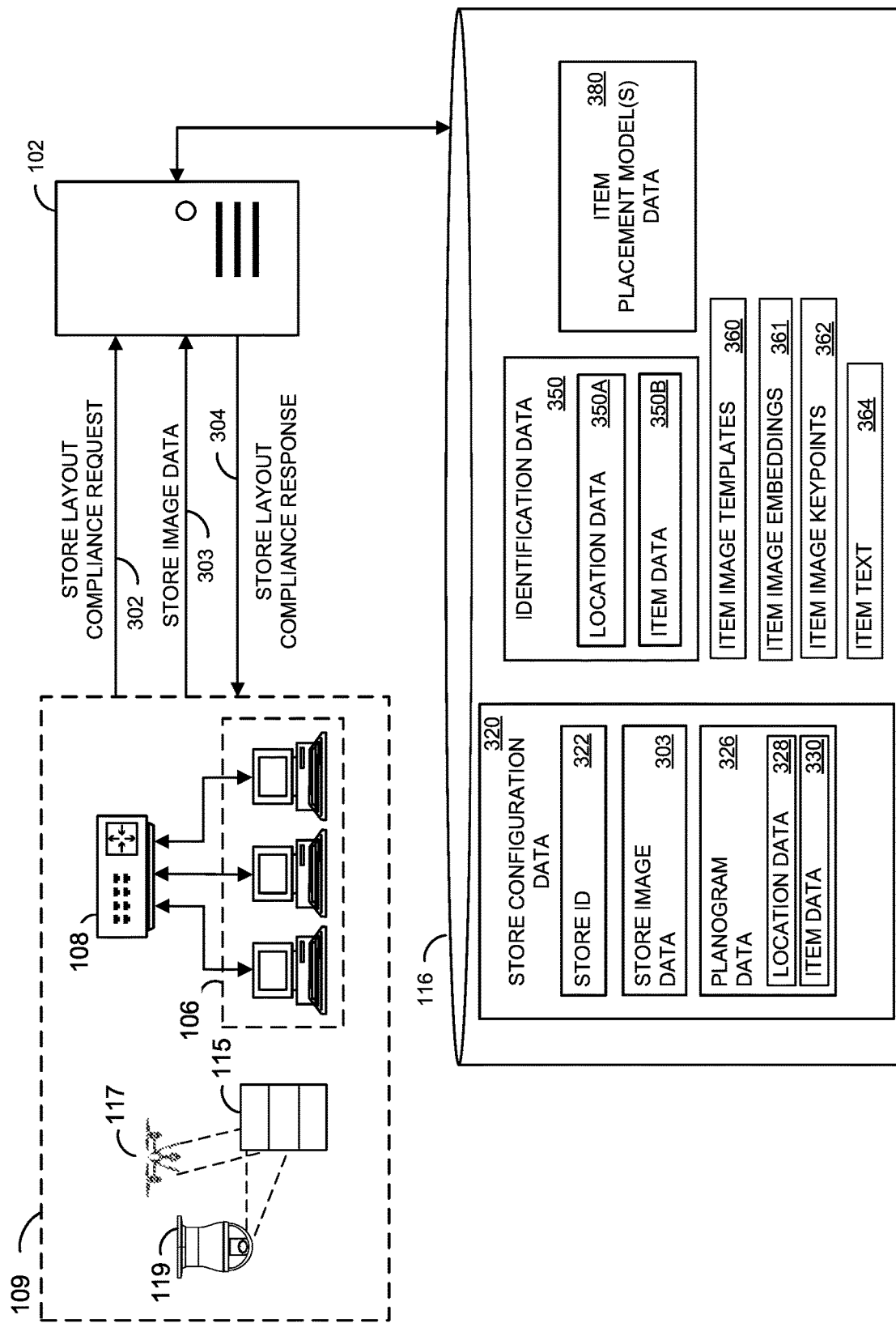
FIGS. 3 and 4 are block diagrams illustrating examples of various portions of the item identification system of FIG. 1 in accordance with some embodiments.

FIG. 3 is a block diagram illustrating examples of various portions of the item identification system of FIG. 1. As illustrated, database 116 stores store configuration data 320 for one or more retail locations, such as store 109. Store configuration data 320 may include for each retail location, among other information, a store identification (ID) 322, store image data 303, and planogram data 326. Store ID 322 identifies the retail location, while store image data 303 may include one or more images of the retail location, such as of item placement locations that hold items (e.g., items for sale) within the retail location, and may further identify the item placement locations captured in the image. For instance, store 109 may capture one or more images of one or more item placement locations, such as 115, using ceiling camera 119 or drone camera 117, and may transmit Further, planogram data 326 may include location data 328, which identifies each of the item placement locations, and corresponding item data 330, which identifies one or more items (e.g., using an item ID) that are to be placed at each item placement location. In some examples, location data 328 identifies (e.g., links to) one or more images within store image data 303 that include a corresponding item placement location.

Database 116 further stores item placement model(s) data 380, which identifies and characterizes and of the models described herein. For instance, item placement model(s) data 380 may include any of the segmentation models, Harris Corner detection models, deep learning CNN models, Scale Invariant Feature Transform models, or deep learning based OCR models described herein. Item identification computing device 102 may obtain item placement model(s) data 380 from database 116, and may execute any of the models as described herein.

Database 116 further stores item image templates 360, item image embeddings 361, item image keypoints 362, and item text 364. Item text 364 may include, for each of a plurality of items, textual information. The textual information may include one or more of an item name, an item ID, an item brand, an item description, item options, an item price, or any other suitable item information. Item image templates 360 may identify and characterize one or more item image templates. Each item image template may include, for example, an image of an item, and may refer (e.g., link to) item text 364 for the item. Item image embeddings 361 may include, for each item, corresponding image embeddings. The image embeddings may be generated based on applying a trained deep learning CNN model to each corresponding image, as described herein.

Item image keypoints 362 may include keypoints generated for each item identified by item text 364. For instance, item identification computing device 102 may generate keypoints as described herein for each image identified by item image templates 360, and may store the generated keypoints within item image keypoints 362. Further, and for each item, item text 365 may refer to (e.g., link to) the corresponding keypoints within item image keypoints 362.

In this example, item identification computing device 102 receives a store layout compliance request 302 from a store 109. The store layout compliance request 302 may include, for example, a store ID 322 identifying the retail location (e.g., store 109) for which a layout assignment is being requested. In response to receiving store layout compliance request 302, item identification computing device 102 may extract the store ID 322 and obtain, from database 116, at least portions of planogram data 326 and store image data 303 based on the extracted store ID 322. For instance, item identification computing device 102 may obtain, for each item placement location identified by location data 328, one or more referenced images from store image data 303.

Further, and for each image corresponding to an item placement location, item identification computing device 102 may perform any of the processes described herein to determine a reduced portion of the image. For instance, item identification computing device 102 may perform one or more of the segmentation processes, price tag determination processes, or corner detection processes described herein to determine relevant portions of each image. Further, item identification computing device 102 may generate reduced image data characterizing the determined relevant portions of each image.

Item identification computing device 102 may then execute any of the correlation processes, convolution process, keypoint detection processes, and textual matching processes, to associate the determined relevant portions of each image to an item corresponding to one of the plurality of item image templates 360. For instance, and as described herein, item identification computing device 102 may apply any one of the correlation processes, convolution process, keypoint processes, and textual detection and matching processes to the reduced image data of each image to associate the image to a corresponding item image template 360.

Further, and as described herein, item identification computing device 102 may generate identification data associating each image to an item corresponding to the determined item image template 360. For example, item identification computing device 102 may obtain item text 364 for each determined item image template 360. The item text 364 may include an item ID, for example. Item identification computing device 102 may also obtain location data 328 for each image. Further, and based on the item text 364 and the location data 328, item identification computing device 102 may generate identification data 350, which may include item data 350B identifying the corresponding item, and location data 350A identifying the corresponding item placement location from which the corresponding image was captured. Item identification computing device 102 may store the identification data 350 within database 116.

Further, and in response to store layout compliance request 302, item identification computing device 102 may generate store layout compliance response 304, which may include at least portions of the identification data 350 generated for each image. For example, the store layout compliance response 304 may identify, for each item placement location (e.g., location data 350A), the determined item (e.g., item data 350B).

In some examples, item identification computing device 102 determines whether any of the items identified by planogram data 326 are misplaced based on identification data 350. For instance, item identification computing device 102 may determine, for each item placement location (e.g., location data 328) identified by the planogram data 326, whether the corresponding item (e.g., item data 330) matches (e.g., is the same as) the determined item (e.g., item data 350B) for the same item placement location (e.g., location data 350A) of identification data 350. If the items do not match (e.g., the item IDs are not the same), item identification computing device 102 identifies the misplaced item within the store layout compliance response 304. If the items do match (e.g., the item IDs are the same), in some examples item identification computing device 102 does not identify the item within the store layout compliance response 304, although in other examples item identification computing device 102 identifies the item within the store layout compliance response 304 as having been verified.

In some examples, the store layout compliance response 304 identifies a number of a same item located at each item placement location. For instance, item identification computing device 102 may add the number of items with the same item ID at a same item placement location, and include the item ID, and the determined number of items, in the store layout compliance response 304.

Item identification computing device 102 may transmit the store layout compliance response 304 to, for example, store 109. In some examples, item identification computing device 102 transmits the store layout compliance response 304 to one or more associate computing devices 110, 112, 114. For instance, if item identification computing device 102 determines that at least one item is misplaced, item identification computing device 102 may generate the store layout compliance response 304 to identify the misplaced item, and may transmit the store layout compliance response 304 to the one or more associate computing devices 110, 112, 114.

Figure 4:
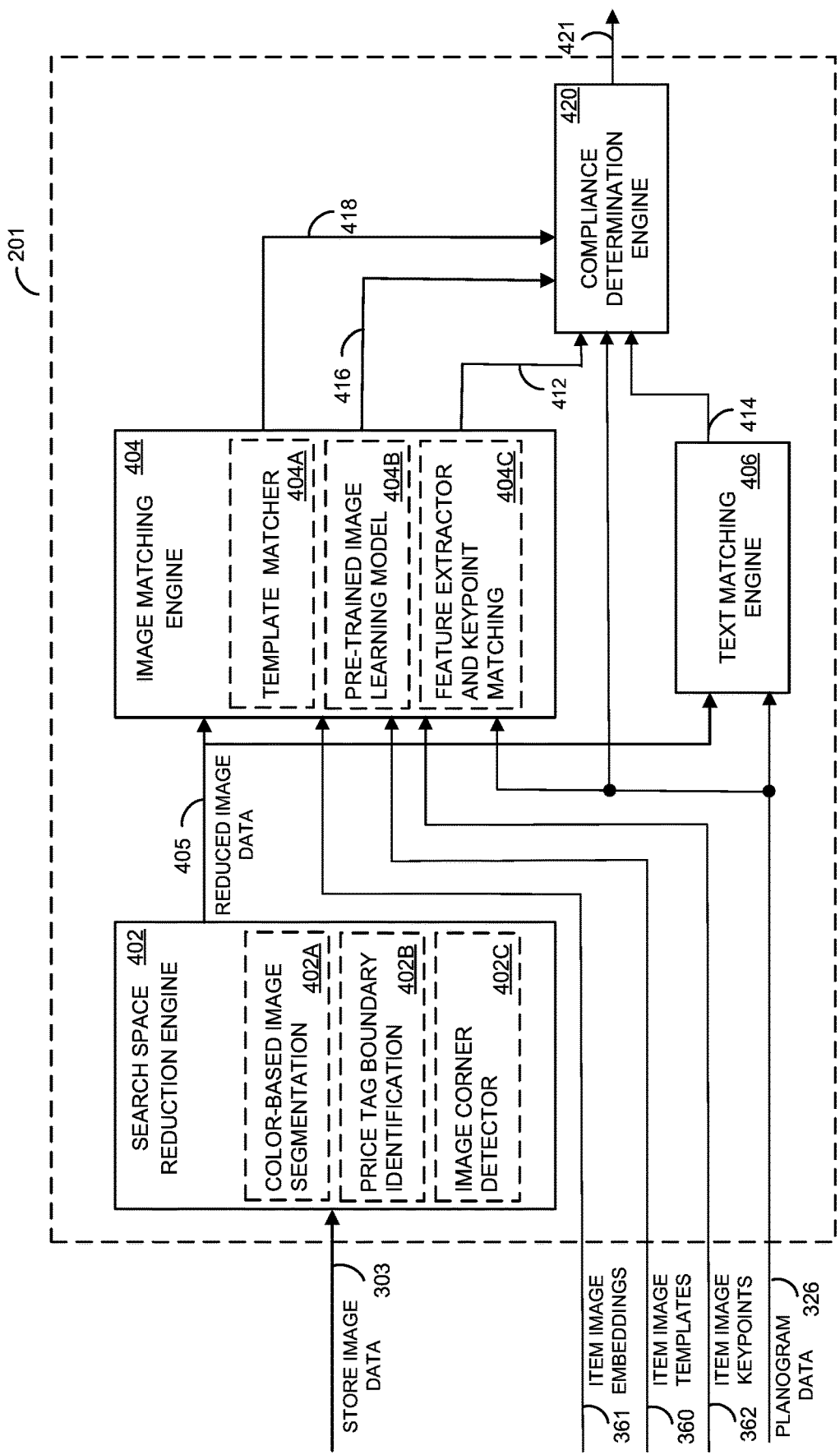

FIG. 4 illustrates exemplary portions of the item identification computing device 102 of FIG. 1. In this example, item identification computing device 102 includes a search space reduction engine 402, an image matching engine 404, a text matching engine 406, and a compliance determination engine 420. In some examples, at least portions of one or more of search space reduction engine 402, image matching engine 404, text matching engine 406, and compliance determination engine 420 may be implemented in hardware, such as with digital logic. In some examples, at least portions of one or more of search space reduction engine 402, image matching engine 404, text matching engine 406, and compliance determination engine 420 may be implemented as an executable program maintained in a tangible, non-transitory memory, such as instruction memory 207 of FIG. 2, which may be executed by one or processors, such as processor 201 of FIG. 2.

As illustrated, search space reduction engine 402 may obtain image data 303, for example, in response to item identification computing device 102 receiving a store layout compliance request 302. Search space reduction engine 402 may apply any of the processes described herein to generate reduced image data 405 characterizing a portion of an image (e.g., as received within store image data 303). For instance, search space reduction engine 402 may include one or more of color-based image segmentation module 402A, price tag boundary identification module 402B, and image corner detector module 402C. Each of color-based image segmentation module 402A, price tag boundary identification module 402B, and image corner detector module 402C may be enabled, or disabled, based on a configuration value, which may be stored in database 116. For instance, search space reduction engine 402 may obtain the configuration value from database 116, and may enable, or disable, each of color-based image segmentation module 402A, price tag boundary identification module 402B, and image corner detector module 402C based on the configuration value.

Color-based image segmentation module 402A can execute any of the segmentation processes described herein to determine a portion of each image received within store image data 303. Price tag boundary identification module 402B can execute any of the price tag determination processes described herein to determine a portion of each image that includes price tag boundaries. Image corner detector module 402C can execute any of the corner detection processes described herein to determine a portion of each image that includes determined corners.

Based on the image portions determined by one or more of color-based image segmentation module 402A, price tag boundary identification module 402B, and image corner detector module 402C, search space reduction engine generates the reduced image data 405. For instance, if only color-based image segmentation module 402A is enabled, search space reduction engine 402 generates reduced image data 405 based on the image portion determined by color-based image segmentation module 402A. If each of color-based image segmentation module 402A, price tag boundary identification module 402B, and image corner detector module 402C are enabled, in some examples search space reduction engine 402 generates reduced image data 405 based on a union the image portions determined by each of color-based image segmentation module 402A, price tag boundary identification module 402B, and image corner detector module 402C. In some examples, search space reduction engine 402 generates reduced image data 405 based on the intersection of the image portions determined by each of color-based image segmentation module 402A, price tag boundary identification module 402B, and image corner detector module 402C.

Image matching engine 404 receives reduced image data 405 from search space reduction engine 402, and further obtains one or more of item image templates 360, item image keypoints 361, and item text 364 from database 116. Image matching engine 404 may apply any of the processes described herein to determine an item image template of the item image templates 360 corresponding to the image portion identified by reduced image data 405. For instance, image matching engine 404 may include one or more of template matcher module 404A, pre-trained learning model module 404B, and feature extractor and keypoint matching module 404C. Each of template matcher module 404A, pre-trained learning model module 404B, and feature extractor and keypoint matching module 404C may be enabled, or disabled, based on a configuration value, which may be stored in database 116. For instance, image matching engine 404 may obtain the configuration value from database 116, and may enable, or disable, each of template matcher module 404A, pre-trained learning model module 404B, and feature extractor and keypoint matching module 404C based on the configuration value.

Template matcher module 404A can apply any of the correlation processes described herein to reduced image data 405 to determine correlations to item image templates 360, and to determine one of the item image templates 360 based on the correlations. Template matcher module 404A may generate correlation template 418 identifying the determined item image template 360.

Pre-trained learning model module 404B can obtain image embeddings 361 for each item image template 360, and can apply any of the convolution processes described herein to convolve the image embeddings 361 across reduced image data 405. Further, pre-trained learning model module 404B can determine one of the item image templates 360 based on the convolutions and the corresponding image embeddings. For instance, pre-trained learning model module 404B may determine a cosine similarity score based on the convolved image and each item image template 360, and determine one of the item image templates 360 based on the cosine similarity scores. Pre-trained learning model module 404B may generate convolution template 416 identifying the determined item image template 360.

Feature extractor and keypoint matching module 404C can execute any of the keypoint detection processes described herein to detect keypoints within reduced image data 405. Further, feature extractor and keypoint matching module 404C can obtain item image keypoints 362 for each item image template 360, and can apply any of the keypoint matching processes described herein to match the keypoints detected within reduced image data 405 to the item image keypoints 362 for each item image template 360. Based on the matching, feature extractor and keypoint matching module 404C can determine one of the item image templates 360. Feature extractor and keypoint matching module 404C may generate keypoint template 412 identifying the determined item image template 360.

Text matching engine 406 may apply any of the textual extraction processes to reduced image data 405 to detect and extract textual information, and may apply any of the textual matching processes described herein to determine a best match of the extracted textual information to item text 364 associated with one of the item image templates 360. Text matching engine 406 may generate text template 414 identifying the determined item image template 360.

Compliance determination engine 420 may determine whether an item is misplaced based on receiving one or more of keypoint template 412, convolution template 416, correlation template 418, and text template 414. For instance, in some examples, compliance determination engine 420 determines, for each item image template 360 identified by any of keypoint template 412, convolution template 416, correlation template 418, and text template 414, a corresponding item.

In some examples, compliance determination engine 420 determines whether the item image template 360 identified by any received keypoint template 412, convolution template 416, correlation template 418, and text template 414 are the same. If they are, compliance determination engine 420 determines the corresponding item. If they are not, compliance determination engine 420 does not determine any corresponding item (e.g., the items are discarded).

In some examples, compliance determination engine 420 determines at least a minimum number (e.g., 2) of the item image templates 360 identified by any received keypoint template 412, convolution template 416, correlation template 418, and text template 414 are the same. If they are, compliance determination engine 420 determines the corresponding item. If they are not, compliance determination engine 420 does not determine any corresponding item (e.g., the items are discarded).

Further, compliance determination engine 420 determines whether the planogram data 326 indicates the same item is to be located at the item placement location identified within the received store image data 303. If compliance determination engine 420 determines that the determined item is not the same item as indicated by the planogram data 326 for the same item placement location, compliance determination engine 420 may generate an item misplaced message 421 that indicates the determined item (e.g., the misplaced item identified in the image), and the item placement location. In some examples, the item misplaced message 421 also indicates an item placement location assigned by the planogram data 326 for the misplaced item.

In some examples, item identification computing device 102 transmits the item misplaced message 421 to one of workstation 106 or associate computing devices 110, 112, 114. The item misplaced message 421 may cause the receiving device to display an alert identifying the misplaced item.

Figure 8:
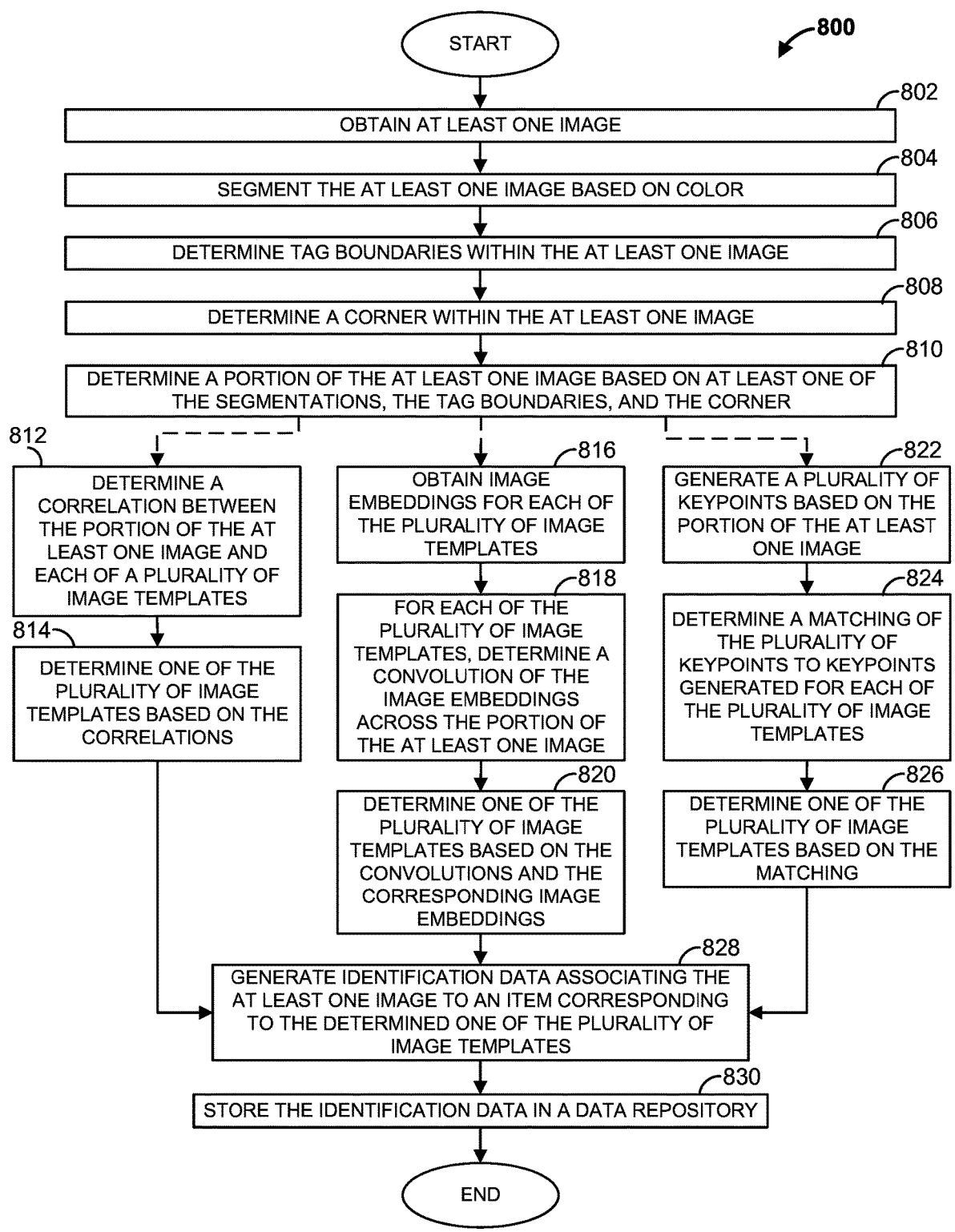
FIG. 8 is a flowchart of an example method that can be carried out by the item identification system 100 of FIG. 1 in accordance with some embodiments.

FIG. 8 is a flowchart of an example method 800 that can be carried out by the item identification computing device 102 of FIG. 1. Beginning at step 802, item identification computing device 102 obtains at least one image. For example, the image may be captured by a drone camera 117 directed at a fixture 502 within store 109. At step 804, item identification computing device 102 segments the at least one image based on color (e.g., R, G, B colors). For example, item identification computing device 102 may apply any of the segmentation processes described herein to the at least one image. Further, and at step 806, item identification computing device 102 determines tag boundaries within the at least one image. For instance, item identification computing device 102 may apply any of the price tag determination processes described herein to the at least one image, and determine one or more price tag boundaries within the image. Further, and at step 808, item identification computing device 102 determines a corner within the at least one image. For example, item identification computing device 102 may apply any of the Harris Corner detection processes described herein to the at least one image to determine one or more corners within the image.

Proceeding to step 810, item identification computing device 102 determines a portion of the at least one image based on at least one of the segmentations, the tag boundaries, and the corner. The resultant portion of the at least one image provides for a reduced search space compared to the entire image. For instance, item identification computing device 102 may determine portions of the image as identified by any of the segmentation processes, price tag determination processes, and corner detection processes, and generates reduced image data characterizing the any identified portions (e.g., a union of the identified portions). In other examples, item identification computing device 102 may determine overlapping portions of the image as identified by each of the segmentation processes, price tag determination processes, and corner detection processes, and generates reduced image data characterizing the overlapping portions (e.g., an intersection of the identified portions).

From step 810, the method may proceed to one or more of steps 812, 816, and 822. For instance, at step 812, item identification computing device 102 determines a correlation between the portion of the at least one image and each of a plurality of image templates. For instance, item identification computing device 102 may apply any of the correlation processes described herein to the portion of the at least one image to determine the correlations. The method then proceeds to step 814, where item identification computing device 102 determines one of the plurality of image templates based on the correlations. For instance, item identification computing device 102 may select the image template with the highest correlation to the portion of the at least one image. The method then proceeds to step 828.

At step 816, item identification computing device 102 obtains image embeddings for each of the plurality of image templates. The image embeddings may have been previously generated and stored in database 116, for example. Further, the image embeddings may be generated based on applying a deep learning CNN model to the plurality of image templates as described herein. Further, at step 818, item identification computing device 102 determines, for each of the plurality of image templates, a convolution of the corresponding image embeddings across the portion of the at least one image. For instance, item identification computing device 102 may apply any of the convolution processes described herein to the image embeddings across the portion of the at least one image. At step 820, item identification computing device 102 determines one of the plurality of image templates based on the convolutions and the corresponding image embeddings. For example, item identification computing device 102 may compute a cosine similarity score between the image embeddings and the convolved image, and may determine one of the plurality of image templates based on the cosine similarity scores. The method then proceeds to step 828.

At step 822, item identification computing device 102 generates a plurality of keypoints based on the portion of the at least one image. For instance, item identification computing device 102 may apply any of the keypoint detection processes described herein to the portion of the at least one image to generate the plurality of keypoints. At step 824, item identification computing device 102 determines a matching of the plurality of keypoints to keypoints generated for each of the plurality of image templates. For instance, item identification computing device 102 may apply any of the keypoint matching processes described herein to match the plurality of keypoints to keypoints generated for each of the plurality of image templates. At step 826, item identification computing device 102 determines one of the plurality of image templates based on the matching. For instance, and as described herein, item identification computing device 102 may determine the closest matching image template. The method then proceeds to step 828.

Step 828 proceeds from any of steps 814, 820, and 826. At step 828, item identification computing device 102 generates identification data associating the at least one image to an item corresponding to the determined one of the plurality of image templates. In some instances, item identification computing device 102 associates the captured image to an item corresponding to any one of the determined image templates. In some instances, item identification computing device 102 determines whether a same item image template was determined at steps 814, 820, and 826. If the same item image template was determined at least twice, item identification computing device 102 associates the captured image to the item corresponding to the same item image template.

Further, item identification computing device 102 generates identification data associating the captured image to an item corresponding to the determined one of the plurality of item image templates. For example, database 116 may store information associating each of the plurality of item image templates to a particular item. The information may include, for example, an item name, an item ID, an item brand, an item description, item options, an item price, or any other suitable item information. Item identification computing device 102 may obtain the information for the item corresponding to the determine item image template, and may generate the identification data identifying the corresponding item based on the obtained information.

Proceeding to step 830, item identification computing device 102 stores the identification data in a data repository, such as in database 116. In some examples, item identification computing device 102 determines whether the identification data identifies an item in accordance with a planogram. For instance, the planogram may identify the placement of a particular item at the fixture from which the image was captured. The method then ends.

Figure 9:
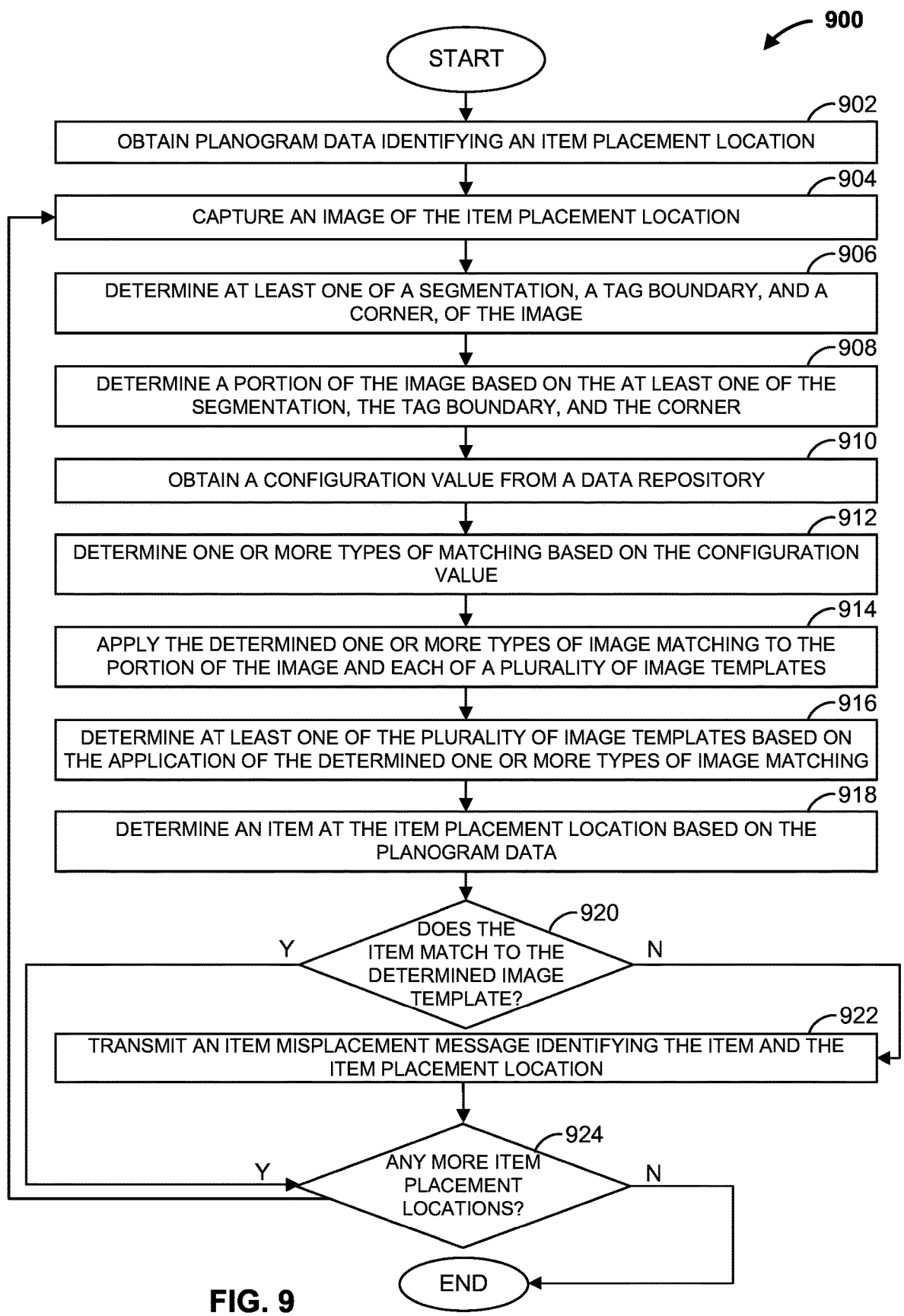
FIG. 9 is a flowchart of another example method that can be carried out by the item identification system 100 of FIG. 1 in accordance with some embodiments.

FIG. 9 is a flowchart of an example method 900 that can be carried out by the item identification computing device 102 of FIG. 1. Beginning at step 902, item identification computing device 102 obtains planogram data identifying an item placement location (e.g., shelf located at X, Y coordinates in store 9, top shelf). At step 904, item identification computing device 102 causes the capture of an image of the item placement location. For instance, item identification computing device 102 may determine the item placement location for an item from the planogram data, and may determine a direction from which a camera should capture an image to include the item placement location. Further, item identification computing device 102 may transmit a message to the camera to capture the image in the direction of the item placement location.

Proceeding to step 906, item identification computing device 102 determines at least one of a segmentation, a tag boundary, and a corner of the image. For instance, item identification computing device 102 may apply any of segmentation processes, price tag determination processes, and corner detection processes described herein to the captured image to determine the segmentations, price tag boundaries, and corner locations, respectively. At step 908, item identification computing device 102 determines a portion of the image based on at least one of the determined segmentations, tag boundaries, and corners.

At step 910, item identification computing device 102 obtains a configuration value from a data repository. For example, item identification computing device 102 may obtain a configuration value from database 116. The configuration value may have been stored in database 116 in response to a user input, such as via user interface 205. At step 912, item identification computing device 102 determines one or more types of matching based on the configuration value. For instance, item identification computing device 102 may determine whether to enable any of the correlation processes, convolution processes, or keypoint detection processes to for item image template matching, as described herein. In some examples, and based on the configuration value, only one of the correlation processes, convolution processes, and keypoint detection processes are enabled. In some examples, and based on the configuration value, two or more of the correlation processes, convolution processes, and keypoint detection processes are enabled.

At step 914, item identification computing device 102 applies the enabled types of matching to the portion of the image and each of a plurality of image templates. For instance, item identification computing device 102 may execute any of the enabled correlation processes, convolution processes, and keypoint detection and matching processes as described herein. Further, and at step 916, item identification computing device 102 determines at least one of the plurality of image templates based on the executed processes, as described herein. For instance, item identification computing device 102 may determine, when correlation processes are enabled, an image template that correlates the most with the portion of the image. Item identification computing device 102 may determine, when convolution processes are enabled, an image template with a highest similarity score. Likewise, item identification computing device 102 may determine, when keypoint detection and matching processes are enabled, an image template that matches the most with the portion of the image.

Proceeding to step 918, item identification computing device 102 determines an item at the item placement location based on the planogram data. For instance, item identification computing device 102 may determine, based on the planogram data, that a particular item (e.g., item SKU number 0x1234_1234, "Brand Good Napkins," 20 count) belongs at the item placement location. At step 920, item identification computing device 102 determines whether the item matches with an item corresponding to the determined image template. For instance, item identification computing device 102 may determine a first SKU number for the item corresponding to the determined image template, and may compare the first SKU number to a second SKU number for the item determined based on the planogram data.

If the item determined based on the planogram data matches with the item corresponding to the determined image template, the method proceeds to step 924. If, however, the items do not match, the method proceeds to step 922, where item identification computing device 102 transmits an item misplacement message. The item misplacement message identifies the item and the item placement location. For example, item identification computing device 102 may transmit the item misplacement message to workstation 106, or any of associate computing devices 110, 112, 114. The reception of the item misplacement message may cause an alert to be displayed on a corresponding interface. In response, an associate of store 109 may go investigate and move the item from the item placement location to its proper location (e.g., as defined by a planogram). The method then proceeds to step 924.

At step 924, item identification computing device 102 determines if the planogram data identifies any more item placement locations. If the planogram data identifies another item placement location, the method proceeds back to step 904, where an image of the additional item placement location is captured. If, however, there are no additional item placement locations, the method ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The embodiments may include a system for validating planogram compliance using pre-defined planogram information, stitched store shelf image, and/or individual product images. The system may use an unsupervised image processing technique(s) and deep learning model(s). Further, the system may capture an image of shelving from stores, and further obtain planogram details (e.g., product name, id, description, location co-ordinates, horizontal and vertical facings, etc.), and/or product images as input. The system may employ search space reduction algorithms to reduce image search space. For instance, the system may employ color and/or shape-based image segmentation to segment images using k-means clustering in color (e.g., R, G, B) space and balance color proximity and space proximity. The system may, additionally or alternatively, identify price tag boundaries (e.g., such as for price tags placed at the left bottom corner of a shelf where a new product starts) to distinguish between the products of the same brand with different pack sizes/quantities, or products between different brands or types. Additionally or alternatively, the system may employ corner detection algorithms, such as Harris Corner detection algorithms, to distinguish between edges and corners in the image.

The system may also employ an image matching techniques such as template matching techniques that loop over an input image at multiple scales for selecting a region with the largest correlation coefficient and using the region as a matched region. Additionally or alternatively, the system may employ pre-trained image embeddings to identify the presence of a particular product in an image region based on higher cosine similarity between the product image embedding and a convolved part of the image. Additionally or alternatively, the system may employ feature extraction to determine keypoints and descriptors in the image using a Scale Invariant Feature Transform method, and may use the difference of Gaussian blurring of an image with two different variances. Further, the system may employ feature matching techniques to match the key-points between two images (in a template and the original image) by identifying their nearest neighbors using a Flann kdtree based matcher, for example.

In some examples, the system enhances the confidence of a match and search by extracting text through optical character recognition (OCR) and matching the extracted text to product descriptions.

The system may output the presence of the product, count of matches, coordinates of the match, text matching, and/or blank space detection for use in multiple different use cases such as item assortment compliance, number of facings compliance, position compliance, item tag mismatch, and shelf availability, for instance. Further, the system works under different lighting conditions in stores and is robust to partial image presence, and approximate matching, among other advantages.

The following clause listing includes exemplary embodiments.

1. A system comprising:
   a computing device comprising at least one processor, where the computing device is configured to:
      obtain an image;
      determine a portion of the image based on applying a segmentation process to the image;
      determine a correlation between the portion of the image and each of a plurality of item image templates;
      determine one of the plurality of item image templates based on the correlations;
      generate identification data associating the image to an item corresponding to the determined one of the plurality of item image templates; and
      store the identification data in a data repository.

2. The system of clause 1, wherein the computing device is configured to:
   determine an item placement location captured within the image;
   obtain planogram data;
   determine, based on the planogram data, whether the item is assigned to the item placement location.

3. The system of clause 2, wherein the computing device is configured to:
   determine that the item is not assigned to the item placement location; and transmit a message that indicates the item and the item placement location.

4. The system of any of clauses 1-3, wherein determining the portion of the image comprises determine tag boundaries within the image.

5. The system of any of clauses 1-4, wherein determining the portion of the image comprises determining corners within the image.

6. The system of clause 5, wherein determining the corners comprises applying a Harris Corner detection model to the image.

7. The system of any of clauses 1-6, wherein the computing device is configured to:
   obtain image embeddings for each of the plurality of item image templates;
   for each of the plurality of item image templates, determine a convolution of the image embeddings across the portion of the image; and
   determine one of the plurality of item image templates based on the convolution of the images.

8. The system of any of clauses 1-7, wherein the computing device is configured to:
   generate a plurality of keypoints based on the portion of the image;
   determine a plurality of keypoint scores based on a matching of the plurality of keypoints to keypoints for each of the plurality of item image templates; and determine one of the plurality of item image templates based on the keypoint scores.

9. The system of any of clauses 1-8, wherein the computing device is configured to:
apply a textual extraction process to the portion of the image data to extract image textual data;
apply a textual matching process to the extracted image textual data and to textual information associated with each of the plurality of item image templates to generate a text matching score; and
determine one of the plurality of item image templates based on the text matching scores.

10. A method comprising:
obtaining an image;
determining a portion of the image based on applying a segmentation process to the image;
determining a correlation between the portion of the image and each of a plurality of item image templates;
determining one of the plurality of item image templates based on the correlations;
generating identification data associating the image to an item corresponding to the determined one of the plurality of item image templates; and
storing the identification data in a data repository.

11. The method of clause 10 comprising:
determining an item placement location captured within the image;
obtaining planogram data;
determining, based on the planogram data, whether the item is assigned to the item placement location.

12. The method of clause 11 comprising:
determining that the item is not assigned to the item placement location; and
transmitting a message that indicates the item and the item placement location.

13. The method of any of clauses 10-12, wherein determining the portion of the image comprises determine tag boundaries within the image.

14. The method of any of clauses 10-13, wherein determining the portion of the image comprises determining corners within the image.

15. The method of clause 14, wherein determining the corners comprises applying a Harris Corner detection model to the image.

16. The method of any of clauses 10-15 comprising:
obtaining image embeddings for each of the plurality of item image templates;
for each of the plurality of item image templates, determining a convolution of the image embeddings across the portion of the image; and
determining one of the plurality of item image templates based on the convolution of the images.

17. The method of any of clauses 10-16 comprising:
generating a plurality of keypoints based on the portion of the image;
determining a plurality of keypoint scores based on a matching of the plurality of keypoints to keypoints for each of the plurality of item image templates; and
determining one of the plurality of item image templates based on the keypoint scores.

18. The method of any of clauses 10-17 comprising:
applying a textual extraction process to the portion of the image data to extract image textual data;
applying a textual matching process to the extracted image textual data and to textual information associated with each of the plurality of item image templates to generate a text matching score; and
determining one of the plurality of item image templates based on the text matching scores.

19. A non-transitory computer readable medium having instructions stored thereon, wherein the instructions, when executed by at least one processor, cause a device to perform operations comprising:
obtaining an image;
determining a portion of the image based on applying a segmentation process to the image;
determining a correlation between the portion of the image and each of a plurality of item image templates;
determining one of the plurality of item image templates based on the correlations;
generating identification data associating the image to an item corresponding to the determined one of the plurality of item image templates; and
storing the identification data in a data repository.

20. The non-transitory computer readable medium of clause 19, wherein the instructions, when executed by the at least one processor, cause the device to perform operations comprising:
determining an item placement location captured within the image;
obtaining planogram data;
determining, based on the planogram data, whether the item is assigned to the item placement location.

21. The non-transitory computer readable medium of clause 20 comprising:
determining that the item is not assigned to the item placement location; and
transmitting a message that indicates the item and the item placement location.

22. The non-transitory computer readable medium of any of clauses 19-21, wherein determining the portion of the image comprises determine tag boundaries within the image.

23. The non-transitory computer readable medium of any of clauses 19-22, wherein determining the portion of the image comprises determining corners within the image.

24. The non-transitory computer readable medium of clause 23, wherein determining the corners comprises applying a Harris Corner detection model to the image.

25. The non-transitory computer readable medium of any of clauses 19-24 comprising:
obtaining image embeddings for each of the plurality of item image templates;
for each of the plurality of item image templates, determining a convolution of the image embeddings across the portion of the image; and
determining one of the plurality of item image templates based on the convolution of the images.

26. The non-transitory computer readable medium of any of clauses 19-25 comprising:
generating a plurality of keypoints based on the portion of the image;
determining a plurality of keypoint scores based on a matching of the plurality of keypoints to keypoints for each of the plurality of item image templates; and
determining one of the plurality of item image templates based on the keypoint scores.

27. The non-transitory computer readable medium of any of clauses 19-26 comprising:
applying a textual extraction process to the portion of the image data to extract image textual data;
applying a textual matching process to the extracted image textual data and to textual information associated with each of the plurality of item image templates to generate a text matching score; and determining one of the plurality of item image templates based on the text matching scores.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a computing device comprising at least one processor, wherein the computing device is configured to:
obtain an image;
determine a portion of the image based on applying a segmentation process to the image;
determine a correlation between the portion of the image and each of a plurality of item image templates;
determine one of the plurality of item image templates based on the correlations;
generate identification data associating the image to an item corresponding to the determined one of the plurality of item image templates;
store the identification data in a data repository;
determine an item placement location captured within the image;
obtain planogram data;
determine, based on the planogram data, whether the item is assigned to the item placement location; and
transmit a message that indicates the item and the item placement location.

2. The system of claim 1, wherein the computing device is configured to:
determine that the item is not assigned to the item placement location.

3. The system of claim 1, wherein determining the portion of the image comprises determining tag boundaries within the image.

4. The system of claim 1, wherein determining the portion of the image comprises determining corners within the image.

5. The system of claim 4, wherein determining the corners comprises applying a Harris Corner detection model to the image.

6. The system of claim 1, wherein the computing device is configured to:
obtain image embeddings for each of the plurality of item image templates;
for each of the plurality of item image templates, determine a convolution of the image embeddings across the portion of the image; and
determine one of the plurality of item image templates based on the convolution of the images.

7. The system of claim 1, wherein the computing device is configured to:
generate a plurality of keypoints based on the portion of the image;
determine a plurality of keypoint scores based on a matching of the plurality of keypoints to keypoints for each of the plurality of item image templates; and
determine one of the plurality of item image templates based on the keypoint scores.

8. The system of claim 1, wherein the computing device is configured to:
apply a textual extraction process to the portion of the image data to extract image textual data;
apply a textual matching process to the extracted image textual data and to textual information associated with each of the plurality of item image templates to generate a text matching score; and
determine one of the plurality of item image templates based on the text matching scores.

9. A method comprising:
obtaining an image;
determining a portion of the image based on applying a segmentation process to the image;
determining a correlation between the portion of the image and each of a plurality of item image templates;
determining one of the plurality of item image templates based on the correlations;
generating identification data associating the image to an item corresponding to the determined one of the plurality of item image templates;
storing the identification data in a data repository;
determining an item placement location captured within the image;
obtaining planogram data;
determining, based on the planogram data, whether the item is assigned to the item placement location; and
transmitting a message that indicates the item and the item placement location.

10. The method of claim 9, comprising:
determining that the item is not assigned to the item placement location.

11. The method of claim 9, wherein determining the portion of the image comprises determining tag boundaries within the image.

12. The method of claim 9, wherein determining the portion of the image comprises determining corners within the image.

13. The method of claim 12, wherein determining the corners comprises applying a Harris Corner detection model to the image.

14. The method of claim 9 comprising:
obtaining image embeddings for each of the plurality of item image templates;
for each of the plurality of item image templates, determining a convolution of the image embeddings across the portion of the image; and
determining one of the plurality of item image templates based on the convolution of the images.

15. The method of claim 9 comprising:
generating a plurality of keypoints based on the portion of the image;
determining a plurality of keypoint scores based on a matching of the plurality of keypoints to keypoints for each of the plurality of item image templates; and
determining one of the plurality of item image templates based on the keypoint scores.

16. The method of claim 9 comprising:
applying a textual extraction process to the portion of the image data to extract image textual data;
applying a textual matching process to the extracted image textual data and to textual information associated with each of the plurality of item image templates to generate a text matching score; and
determining one of the plurality of item image templates based on the text matching scores.

17. A non-transitory computer readable medium having instructions stored thereon, wherein the instructions, when executed by at least one processor, cause a device to perform operations comprising:
obtaining an image;

determining a portion of the image based on applying a segmentation process to the image;
determining a correlation between the portion of the image and each of a plurality of item image templates;
determining one of the plurality of item image templates based on the correlations;
generating identification data associating the image to an item corresponding to the determined one of the plurality of item image templates;
storing the identification data in a data repository;
determining an item placement location captured within the image;
obtaining planogram data;
determining, based on the planogram data, whether the item is assigned to the item placement location; and
transmitting a message that indicates the item and the item placement location.

* * * * *